(12) United States Patent
Hofmann et al.

(10) Patent No.: US 9,672,759 B2
(45) Date of Patent: Jun. 6, 2017

(54) PROBE BASED IDENTIFICATION AND VALIDATION OF ROUNDABOUT JUNCTIONS

(71) Applicant: HERE Global B.V., Veldhoven (NL)

(72) Inventors: Hilko Hofmann, Liederbach a. Ts. (DE); Prokop Jehlicka, Oberursel (DE)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 14/708,827

(22) Filed: May 11, 2015

(65) Prior Publication Data
US 2016/0335923 A1    Nov. 17, 2016

(51) Int. Cl.
*G01C 21/20*    (2006.01)
*G09B 29/00*    (2006.01)
*G01C 21/32*    (2006.01)

(52) U.S. Cl.
CPC .......... *G09B 29/003* (2013.01); *G01C 21/20* (2013.01); *G01C 21/32* (2013.01); *G09B 29/004* (2013.01)

(58) Field of Classification Search
CPC .... G09B 29/003; G09B 29/004; G01C 21/20; G01C 21/32
See application file for complete search history.

(56) References Cited

U.S. PATENT DOCUMENTS

| | | |
|---|---|---|
| 6,732,046 B1 | 5/2004 | Joshi |
| 8,612,136 B2 | 12/2013 | Levine et al. |
| 2006/0149780 A1 | 7/2006 | Joshi |
| 2007/0293985 A1 | 12/2007 | Myeong et al. |
| 2010/0082248 A1 | 4/2010 | Dorum et al. |
| 2010/0082307 A1 | 4/2010 | Dorum et al. |
| 2011/0071801 A1* | 3/2011 | Carrasco ............. G06F 17/5004 703/1 |
| 2011/0224893 A1* | 9/2011 | Scofield ............. G01C 21/3492 701/119 |
| 2012/0306923 A1 | 12/2012 | Boschker et al. |
| 2014/0278052 A1* | 9/2014 | Slavin ................ G01C 21/3492 701/400 |

(Continued)

FOREIGN PATENT DOCUMENTS

| | | |
|---|---|---|
| CN | 102313556 | 4/2014 |
| WO | WO2010105712 | 9/2010 |
| WO | WO2013160471 | 10/2013 |

OTHER PUBLICATIONS

Ameur Touir et al., Design and Implementation of an Automatic Road Network Map Processing System Using GPS Technology, 2003, King Saud University, pp. 1-7.

(Continued)

*Primary Examiner* — Behrang Badii
*Assistant Examiner* — Daniel L Greene
(74) *Attorney, Agent, or Firm* — Lempia Summerfield Katz LLC

(57) ABSTRACT

Probe data including points with geographic locations and heading angles are identified for a geographic area. A translation is performed on the points in the probe data in a predetermined direction orthogonal to the corresponding heading. The translated points are aggregated according to a location grid. The aggregated points are analyzed from the location grid according to the heading. A potential location for a center of a roundabout road formation is determined based on the analysis.

20 Claims, 27 Drawing Sheets

(56) References Cited

U.S. PATENT DOCUMENTS

2015/0193562 A1\* 7/2015 Chan .................. E01C 1/02
                                                                                          703/1

OTHER PUBLICATIONS

Barrile et al., Automatic Recognition of Road Signsby Hough Transform: Road-GIS, Jan. 20, 2012, Geomatics Labratory, Journal of Earth Science and Engineering 2, pp. 42-50.

Bildsegmentierung: Hough-Transformation, Power Point presentation, Accessed Mar. 26, 2015, http://cvpr.uni-muenster.de/teaching/ws12/ComputerVisionMustererkennungWS12/script/CVME-07-Segmentation-Hough.pdf, pp. 1-30.

Garcia-Garrido et al., Fast Road Sign Detection Using. Hough Transform for Assisted Driving of Road Vehicles, 2005, University of Alcala, Madrid, Spain, pp. 542-548.

Yin Wang et al., CrowdAtlas: Self-Updating Maps for Cloud and Personal Use, Jun. 25-28, 2013, http://web.eecs.umich.edu/~yinw/publication/mobisys13-final.pdf, 14 pages.

Clement Zinoune et al., Detection of Missing Roundabouts in Maps for Driving Assistance Systems, Jun. 19, 2014, 7 pages.

Jorge Marques et al., Fast Estimation of Multiple Vector Fields: Application to Video Surveilance, 2011, Instituto Superior Tecnico, Lisboa, Portugal, 6 pages.

Marcos Lage et al., Vector Field Reconstruction from Sparse Samples with Applications, 2006, Computer Graphics and Image Processing, 8 pages.

\* cited by examiner

PROBE BASED IDENTIFICATION AND VALIDATION OF ROUNDABOUT JUNCTIONS

FIELD

The following disclosure relates to an analysis of probe data for the identification of road formations, and more particularly to an analysis of probe data for the identification of roundabout junctions.

BACKGROUND

Map data or geographic data is used in computer-based systems that provide useful features to users. For example, the computer-based systems may provide the identification of routes to destinations or points of interests. A navigation system may determine the optimum route to be taken by the end user to travel from an origin to a destination location from map data stored in a map database. Similarly, the navigation system may query the map data for nearby points of interest or provide other map-related functions.

As new roads are built, other roads are closed, or locations of business are changed, the geographic data becomes out of date. These changes to the physical infrastructure must be detected in order to update the map database. One of the usual changes in the infrastructure of the physical road network represented in the map database is the change of a conventional intersection to a roundabout. This change is particularly hard to detect because two roadways that simply intersected in straight lines now merge into a common path for a short amount of time on a relatively small area extend. Challenges remain in the automation of the detection of roundabouts from probe data.

SUMMARY

In one embodiment, a method includes receiving probe data for a geographic area, identifying a plurality of points in the probe data, wherein each of the plurality of points includes a geographic location and a heading, performing a translation on the plurality of points in the probe data in a predetermined direction orthogonal to the corresponding heading, aggregating the plurality of points, after translating, according to a location grid, performing an analysis on the plurality of points in the location grid according to the heading, and identifying a center of a roundabout road formation based on the analysis.

BRIEF DESCRIPTION OF THE DRAWINGS

Exemplary embodiments of the present invention are described herein with reference to the following drawings.

FIG. 18 illustrates an example straight roadway.

DETAILED DESCRIPTION

The construction of new roundabouts or significant changes in existing roundabouts of an intersection are particularly difficult to detect for a variety of reasons. The traffic in the roundabout moves in many directions or headings. The roundabouts may have different sizes in diameter, and have any number of inbound and outbound roads. A roundabout may be a circular, elliptical, or polygonal intersection or junction between two or more roadways. In a road network model or map database, a roundabout may be defined as a continuous or close loop roadway having a radius less than a particular size and intersecting with two or more roadways. A roundabout may be a two-dimensional closed roadway in which traffic outside of the closed roadways yields to traffic already in the closed roadway. Roundabouts may include road circles, rotaries, or traffic circles.

Figure 1:
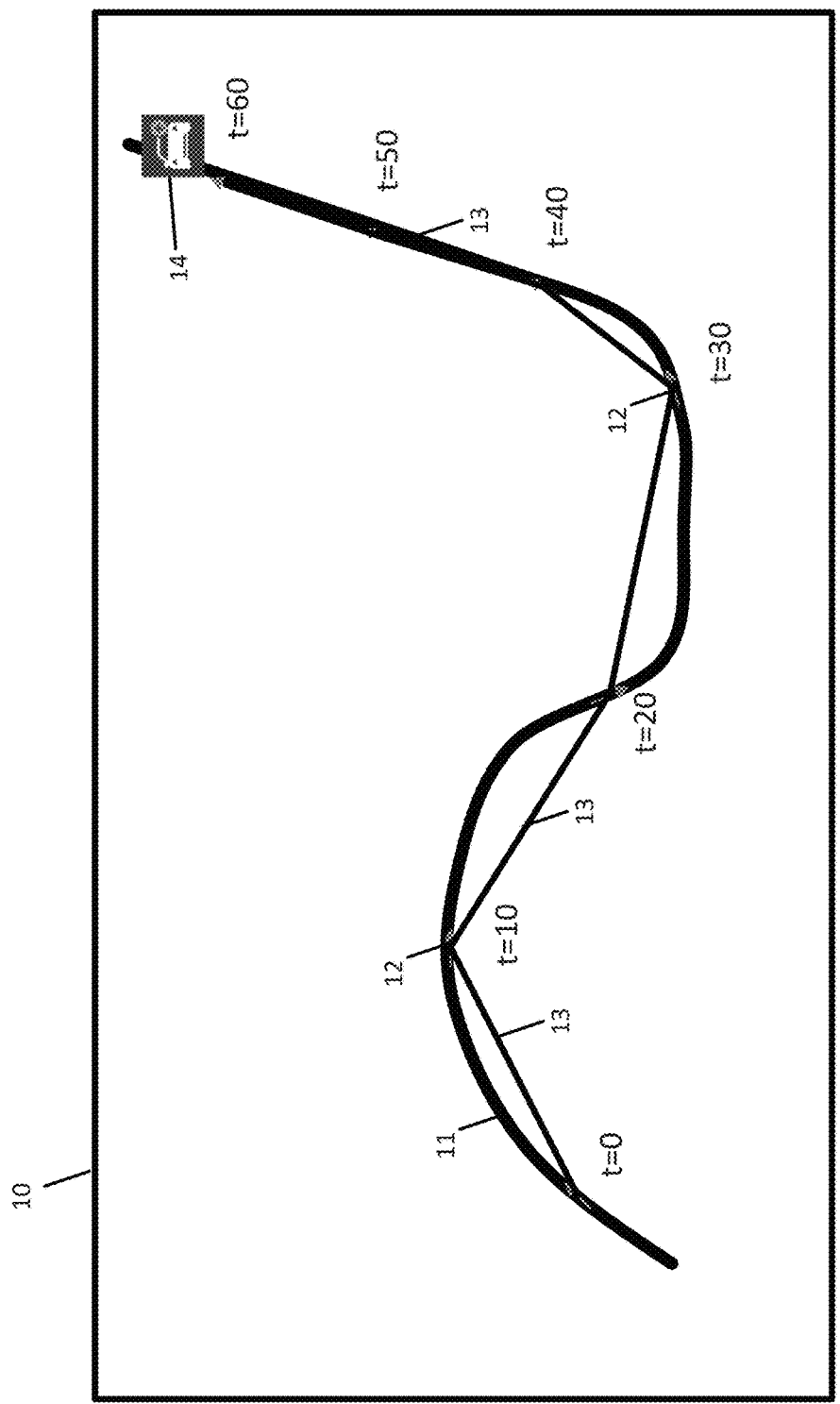
FIG. 1 illustrates an example of probe data collection.

FIG. 1 illustrates an example of probe data collection. Map developers or map editing companies may use probe data to gather information about a road network including roundabouts. Probe data may be localized positions collected from vehicles moving along the road. The probe data may include geographic coordinates (e.g., latitude and longitude; X and Y coordinates), a heading (e.g., degrees or radians measured from a reference direction), and an altitude (e.g. height above sea level), or any other geographic or metadata-based attributes.

FIG. 1 illustrates a road 11, a series of probe points 12, a probe track 13, and a vehicle 14. The vehicle 14 has traveled along the road 11 and collected the series of probe points 12. The vehicle 14 may include an integrated collection device including a global positioning system (GPS). The vehicle 14 may internally carry a collection device such as a mobile device (e.g., a smartphone or other navigation device) including similar positioning circuitry. By way of example, at predetermined intervals (e.g., 10 seconds in FIG. 1), the collection device collects a probe data. Data collection may also be triggered dynamically depending on the speed or curvature of the driving path. The probe tracks 13 illustrate a straight line path between two consecutively collected probe points. As additional vehicles travel the road 11, more probe points are collected. The multitude of all probe point is located along the actual shape of the road geometry.

Map developers may detect probe points that are not near a current road in order to identify a new road or a changed road shape. Further, it is possible to detect changes in probe point behavior to detect changes in road attributes By way of example, this could be speed, curvature, new intersections or other features. Similar to that, when an Intersection is changed into a roundabout the behavior of the probes changes. Visually, this intersection can be identified as a roundabout quite easily. The challenge is the automated identification of these roundabouts quickly and efficiently in order to create a more accurate and fresh map database. Further processing makes it possible to check a roundabout against historical data and historical roundabout identification as well as against current road network data. Thus, information can be retrieved if the roundabout has been recently built not being a roundabout before and if the road network indicate a junction that has been there before or if the roundabout is already digitized in the road network.

One or more of the following embodiments increase the efficiency of map editing by identifying roundabouts and automatically update the changes into a road network database. One or more of the following embodiments may create a list of possible new roundabouts, so that human resources can edit the changes accordingly. In both variants, the priority include a reduction of false positives because both the automated update as well as the manual editing of listed possible roundabouts depends on the correctness of the list. The fewer false positive roundabouts are marked, the more efficient the process of road network update can be achieved.

Figure 2:
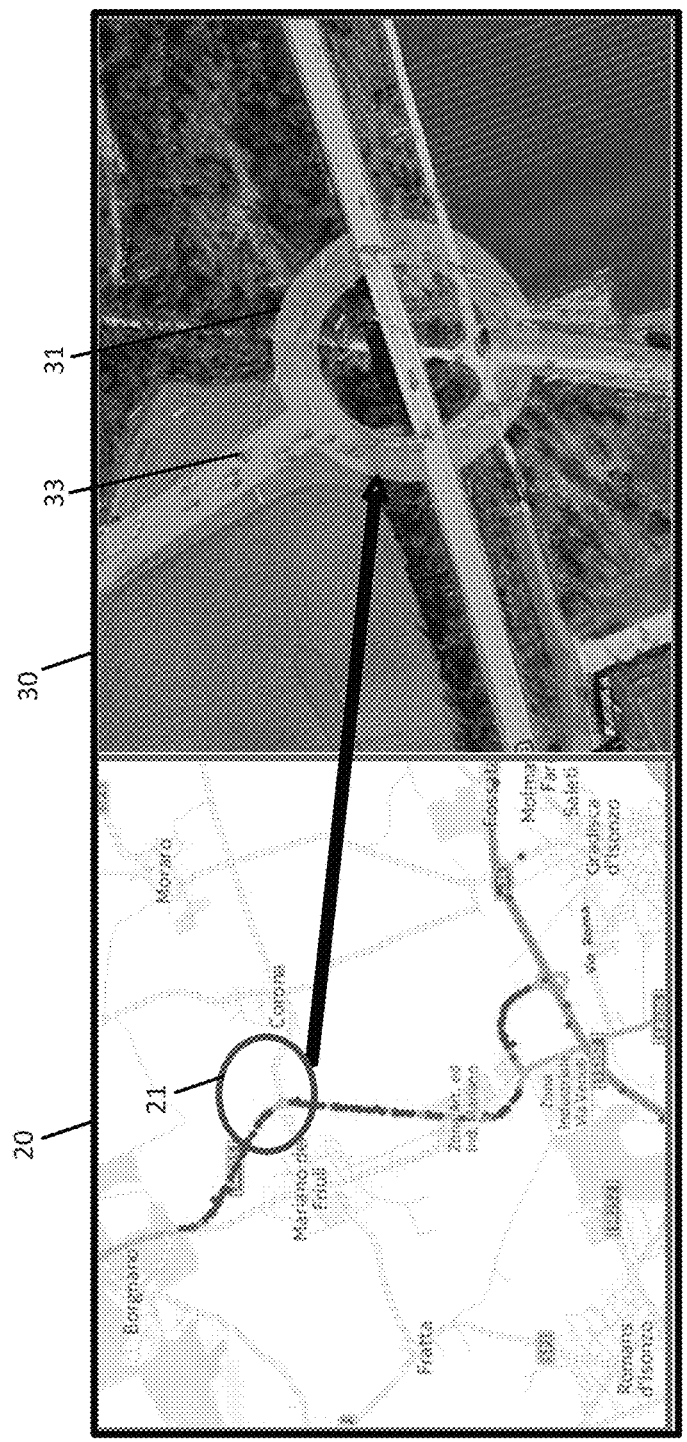
FIG. 2 illustrates an example of new road geometry on outdated satellite imagery.

FIG. 2 illustrates an example of new road geometry and satellite imagery. The left portion 20 of FIG. 2 illustrates a map include several road segments and associated probe data. The right portion 30 of FIG. 2, zoomed in on circle 21, illustrates satellite imagery, overlaid with the road segment and the new roundabout segment 31 determined from the probe data, which are illustrated as vectors 33 having a location, direction, and speed. Note that the probe data illustrates a new roundabout that has been constructed but not yet photographed for the satellite imagery.

Figure 3:
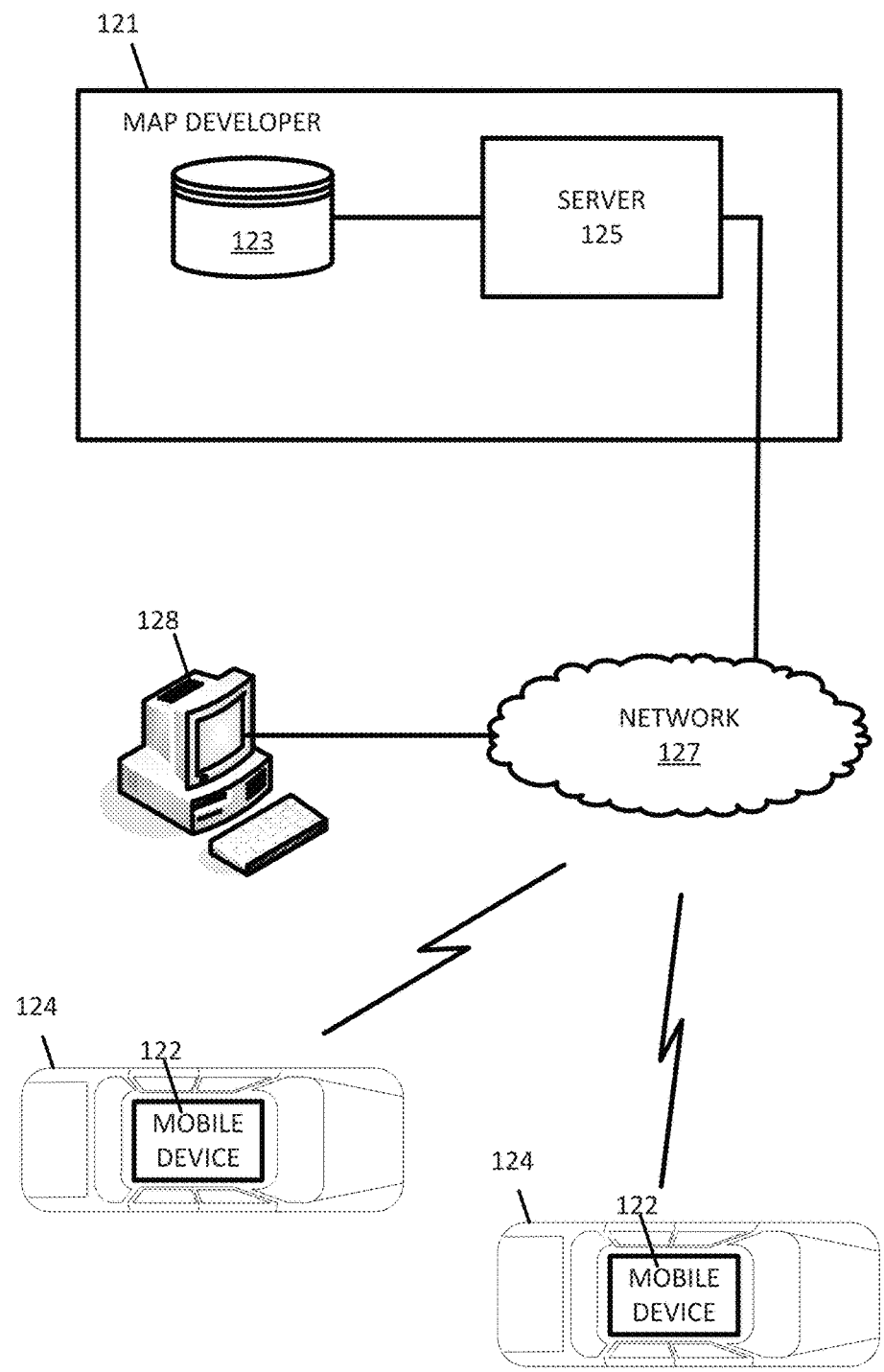
FIG. 3 illustrates an example system for probe based identification and validation of roundabout junctions.

FIG. 3 illustrates an example system for probe based identification and validation of roundabout junctions. The system 120 includes a developer system 121, one or more mobile devices 122 (navigation devices), a workstation 128, and a network 127. The mobile devices 122 may be carried by or integrated in vehicles 124. Additional, different, or fewer components may be provided. For example, many mobile devices 122 and/or workstations 128 connect with the network 127. The developer system 121 includes a server 125 and one or more databases. The term database and map database refers to a set of data or map data stored in a storage medium and may not necessarily reflect specific any requirements as to the relational organization of the data or the map data. The database 123 may be a geographic database including road segments. The server 125 may maintain multiple map databases, including a master copy of the database that may be the most current or up to date copy of the database and one or more past versions of the database. In addition, the mobile device 122 may store a local copy of the database. In one example, the local copy of the database 123 is a full copy of the geographic database, and in another example, the local copy of the database 123 may be a cached or partial portion of the geographic database based on the location of the mobile device 122.

The term server is used herein to collectively include the computing devices at the map developer for creating, maintaining, and updating the multiple databases. Any computing device may be substituted for the mobile device 122. The computing device may be a host for a website or web service such as a mapping service or a navigation service. The mapping service may provide maps generated from the geographic data of the database 123, and the navigation service may calculate routing or other directions from the geographic data of the databases 123.

The server 125 is configured to receive probe data for a geographic area. The geographic area may be an area where probe data is collected. The geographic area may be a politically defined area such as a city, county, state, or country. The geographic area may be selected based on a user input. For example, the user input may specify a particular route or series of road segments. The user input may specify a particular intersection or other region where the existence of a roundabout has been estimated. The server 125 identifies a set of points in the probe data that each include a geographic location (e.g., latitude and longitude) and a heading. The geographic area may be selected automatically as the entire world, or smaller region, is iteratively examined for new or existing roundabout locations.

The server 125 is configured to perform a translation on the set of points in the probe data in a predetermined direction orthogonal to the corresponding heading. The translation may be orthogonal to the heading of the probe point. The translation may be to the left for right hand traffic and to the right for left hand traffic. In other words, the server 125 may determine whether the geographic area for the probe data corresponds to a right hand traffic country (e.g., United States, Brazil, or Russia) or a left hand traffic country (e.g., Ireland, South Africa, or India). For example, the server 125 may consult a lookup table that indexes geographic areas as either right handed traffic or left handed traffic. The distance that the probe data is translated to the left or to the right may be referred to as a potential radius for the roundabout and is discussed in more detail below.

Figure 4B:
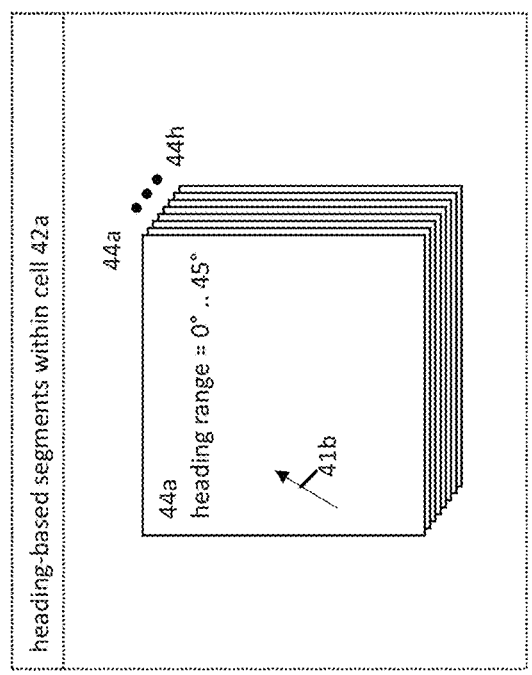
FIG. 4B illustrates a distribution of probe data by heading.
Figure 4A:
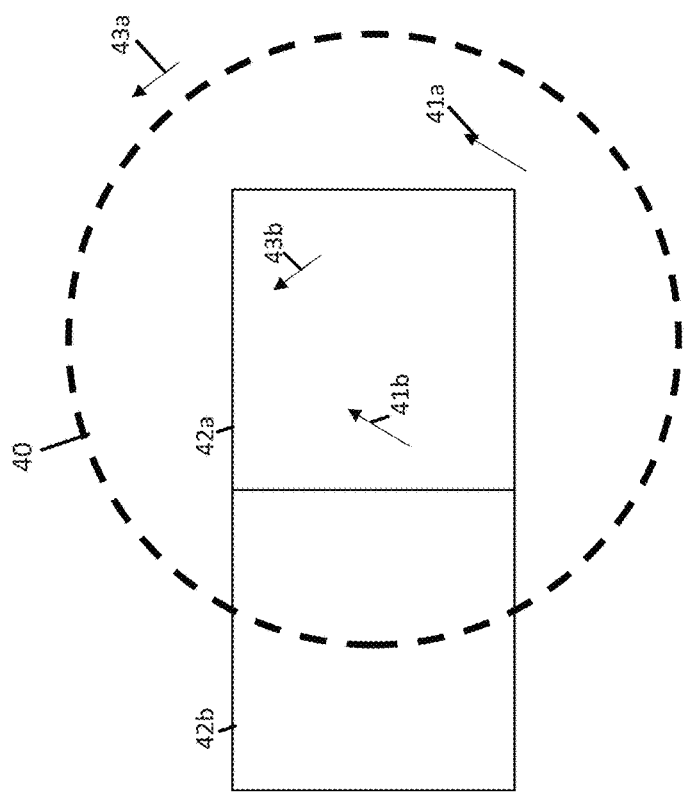
FIG. 4A illustrates an example probe data translation.

FIG. 4A illustrates an example probe data translation in a geographic area having right-handed traffic. A dotted line 40 represented an actual path of a roundabout. In one example, the roundabout is not currently included in the map data or stored by the database 123. Thus, the location of the roundabout is unknown. Various probe data 41a, 43a, have been collected. Many other probe data may have been collected but are not illustrated. The probe data 41a, 43a, are translated in a direction orthogonal to the direction of the heading vectors and to the left resulting in the translated probe data 41b, 43b since the geographic area has right handed traffic. In areas with left-handed traffic the probe data is translated to the right of the heading vectors. The distance of the translation, or potential radius, may correspond to a discrete location grid, having one or more cells.

The example in FIG. 4A illustrates rectangular cells 42a and 42b and the geographic area may be overlaid with more cells. The dimensions and positioning of the cells may be static or dynamic by latitude and/or longitude and further may vary in size and overlapping. The server 125 is configured to aggregate the set of points, after the points have been translated, according to a location grid and the multiple cells. The translated probe data 41b and 43b are illustrated aggregated into the cell 42a. Many more probe data points may be aggregated into the illustrated cells 42a and 42b and other cells. The translated probe data 45b, however, is not aggregated into the cell 42a.

As shown in FIG. 4B, the server 125 is configured to perform an analysis on the plurality of translated probe points within one or more cells in the location grid according to the one or more different headings. The one or more cells of the location grid are partitioned according to their heading into heading-based segments. Thus, probe data having similar headings from similar geographic locations are translated and grouped to the same heading-based segments. The example in FIG. 4B for cell 42a includes eight segments illustrated as rectangular layers, 44a-h. For example, probe data 41a is translated to cell 42b and in this cell is assigned to heading-based segment 44a, respectively. The heading-based segments 44a through 44h represents the range of headings each within the full spatial extend of the cell 42a.

Thus, the server 125 may determine how many of the segments 44a-h received translated data points. Probe data having located sufficiently close to the actual roundabout (dotted line 40) and having a sufficiently congruent heading to the actual roundabout (dotted line 40) is translated into the same cell 42a, and depending on the angular location along the actual roundabout, are translated into respective segments 44a-h.

The server 125 is configured to identify a center of a roundabout road formation based on the analysis. For example, when a threshold number of the segments 44a-h include data points, the server 125 identifies the potential radius used in the translation as the radius of the new roundabout road formation. In another example, when a threshold number of probe data is included in each of the segments 44a-h, the server 125 identifies the center of the cell 42a as the center of the new roundabout road formation. In another example, when a threshold number of probe data is included in a threshold number of the segments 42a-h, the server 125 identifies the center of the cell 42a and the potential radius as the center and radius, respectively, of the new roundabout road formation.

In some examples, the criteria are evaluated for available cells (e.g., cells 42a, 42b, and others) separately and for a set of every radius available (e.g., $R_1$, $R_2$, and others) separately. The various evaluations on one or more cells and on one or more radii may be done in parallel or a serialized manner. In some instances of the serial manner, when none of these criteria are met at a cell or a radius, or the selected criteria are not met at a cell or a radius, the server 125 adjusts the size of the cells or the center locations of the cells. In some instances, none of these criteria are met, or the selected criteria are not met, and the server 125 adjusts the potential radius. The server 125 may increment or decrement the potential radius by a predetermined value or a predetermined proportion. After identifying a new location grid and aggregating the translated probe data in the cells of the location grid, the server 125 determines whether each iteration of the potential radius should be identified as a new roundabout size for that location. In one alternative, the server 125 may compare the various iterations corresponding to different potential radius sizes and select the radius size with the best distribution of probe data in the segments (e.g., the highest proportion of segments covered or the highest quantity of probe data in the segments).

In other words, for each iteration of the size of the potential radius, the server 125 performs an additional analysis comprising performing a translation on the probe data in another distance orthogonal to the corresponding heading, aggregating the points, after translating, according to the one or more cells in the location grid, segmenting on the plurality of points in the one or more cells in the location grid according to the heading. Subsequently, the server 125 may identify the center of the roundabout road formation, and the associated potential radius, based on the analyses at the various potential radii. In one alternative, the various potential radii are determined for the roundabout road formation based on a statistical analysis of the collected probe points.

The mobile device 122 may be a personal navigation device ("PND"), a portable navigation device smart phone, a mobile phone, a personal digital assistant ("PDA"), a car, a tablet computer, a notebook computer, and/or any other known or later developed connected device or personal computer. Non-limiting embodiments of navigation devices may also include relational database service devices, mobile phone devices, or car navigation devices.

The developer system 121, the workstation 128, and the mobile device 122 are coupled with the network 127. The phrase "coupled with" is defined to mean directly connected to or indirectly connected through one or more intermediate components. Such intermediate components may include hardware and/or software-based components.

In one embodiment, the server 125 performs a Hough transform in order to identify the new roundabout location. The Hough transformation is an image processing technique in which a voting procedure is applied to a parameter space. A set of parametric equations may be used to describe lines or points, which are compared by dividing the lines or points into bins of a histogram. The accumulation in the bins is a voting procedure for identifying the geometric features.

In another embodiment, the server 125 performs a different circular analysis to identify potential roundabout locations from probe data in a circular shape or a substantially circular shape. For example, the circular analysis may include a geometric analysis, a least squares analysis, a vector field analysis, or another technique.

Figure 5:
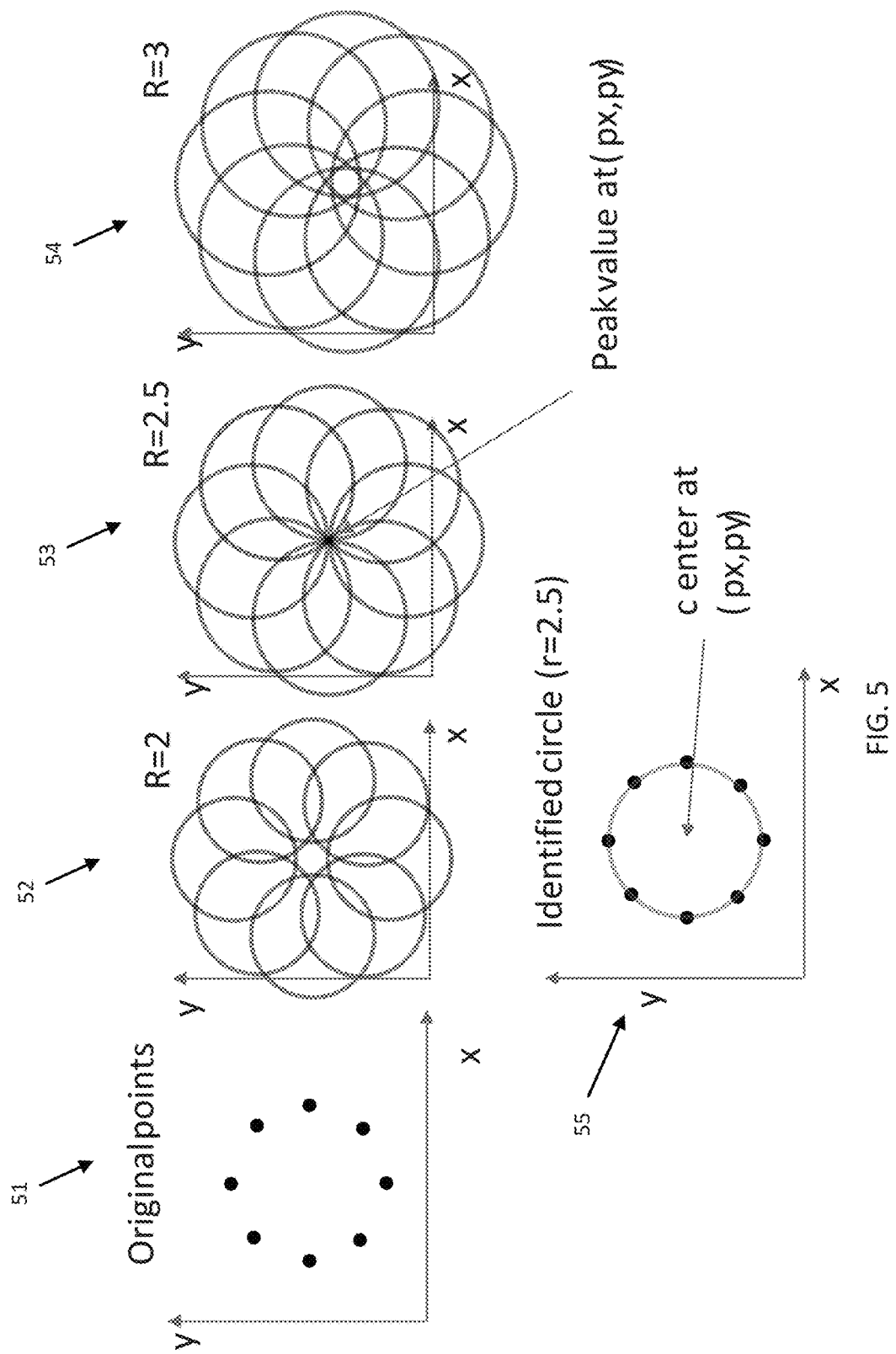
FIG. 5 illustrates an example circle detection.

FIG. 5 illustrates an example circle detection. Plot 51 illustrates the original points. Plot 52 illustrates circles drawn around each of the original points having a radius of 2. Plot 53 illustrates circles drawn around each of the original points having a radius of 2.5. Plot 53 illustrates circles drawn around each of the original points having a radius of 3. The Hough transform identifies the peak value in plot 53. The Hough transform may identify that a high number of circles intersect because the bins associated with the location have a high vote or count. Thus, the circle on that or near that the original probe points lie is reconstructed or identified by plot 55.

Figure 6:
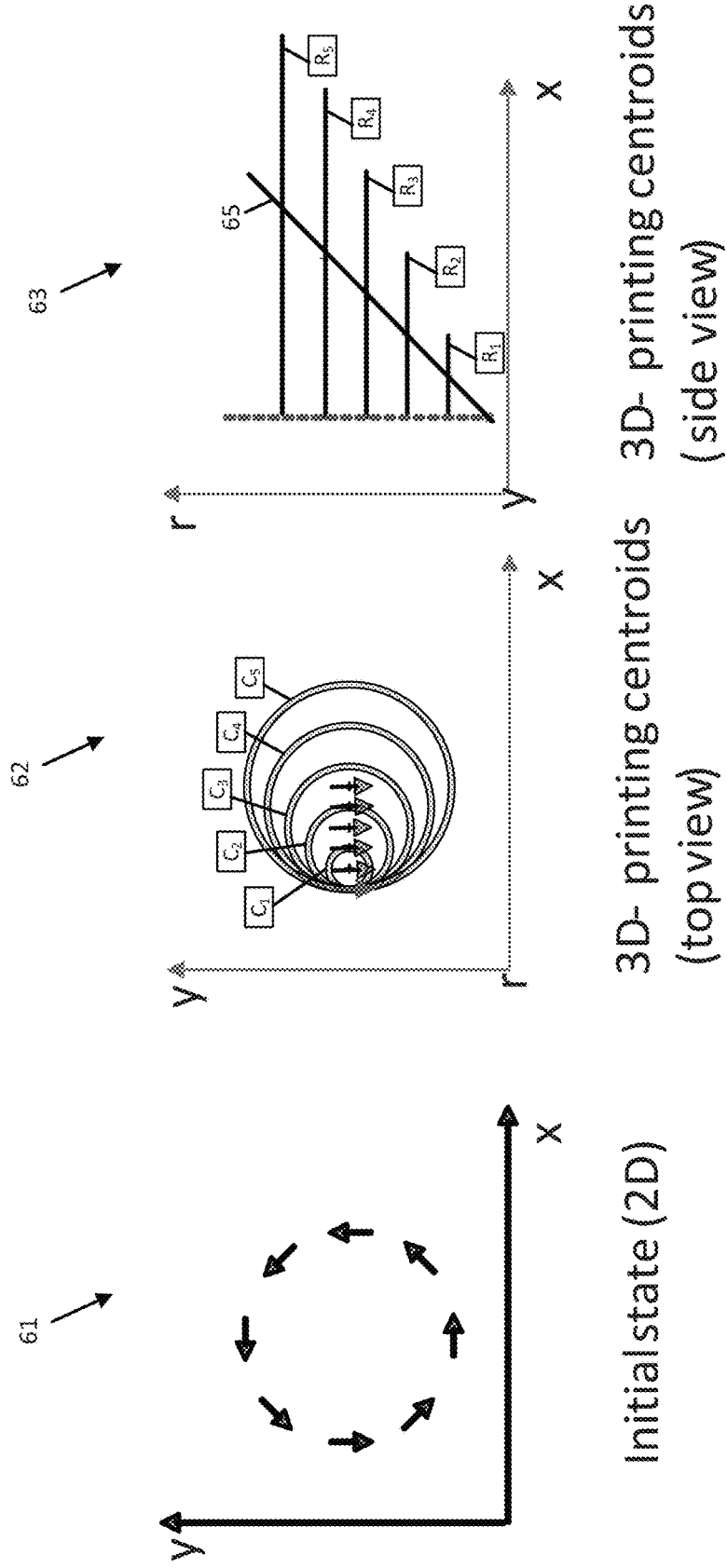
FIG. 6 illustrates an example of vectored circle detection in three dimensions.

FIG. 6 illustrates an example of vectored transform that may be used in a circle detection (e.g. a Hough transform). A space (e.g., Hough space) is defined in four dimensions, including the dimension latitude, the dimension longitude, the circle radius, and the heading value.

Plot 61 illustrates probe data vectors include a geographic location and a heading. For purposes of illustration, the probe data are shown in a perfect circle having both locations that lie on the circle and angles congruent with tangent lines of the circle.

Plot 62 illustrates multiple iterations that are attempted for one of the probe points. In that illustration the probe point is translated by various possible radii $r_1$ through $r_5$ showing five possible center points. The illustration additionally shows the appropriate circles $C_1$ through $C_5$ around the center points. All circles are passing the location of the original probe point. In a 3D-coordinate system the radius r can be seen as the $3^{rd}$ not printable dimension axis in this plot.

Plot 63 illustrates the rotation of plot 62 by 90 degrees around the x-axis. The horizontal lines $R_1$ through $R_5$ represents the projections of the circles $C_1$ through $C_5$ of illustration 62. The diagonal line 65 represents the appropriate position of the translated probe point according to the given radius r, the y-value in this plot is the $3^{rd}$ not illustrated dimension.

Figure 7:
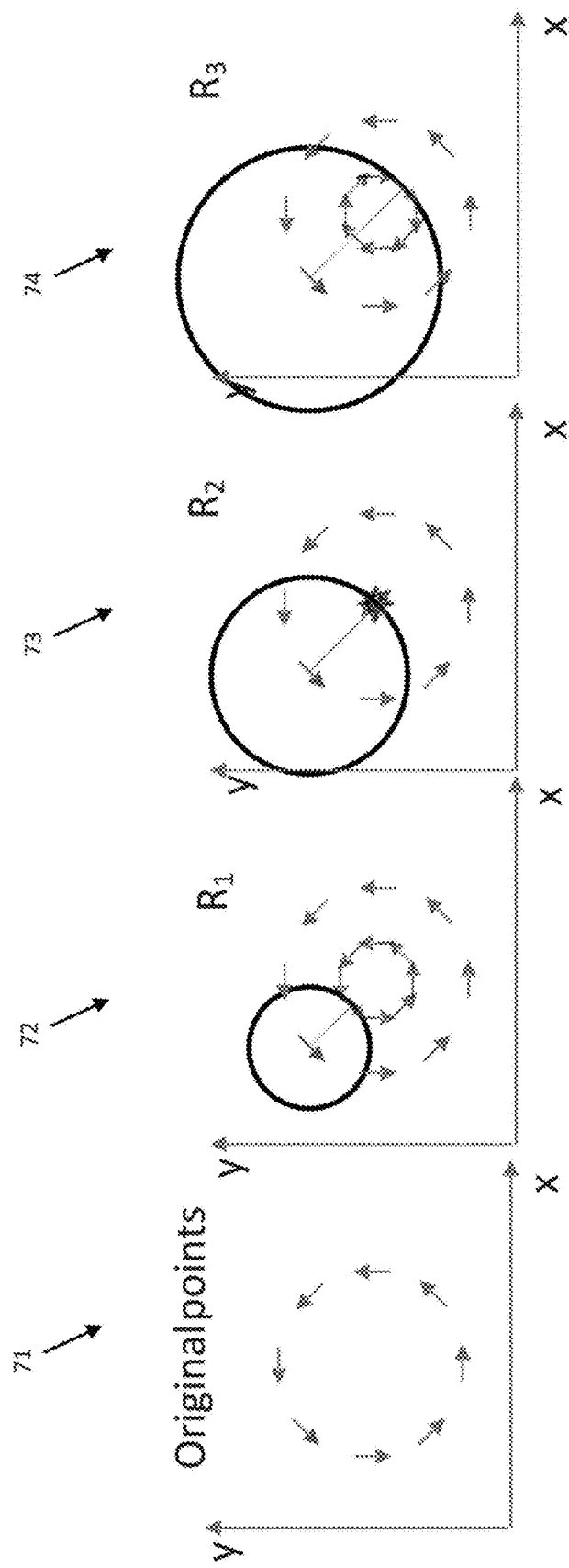
FIG. 7 illustrates an example of enhanced circle detection with heading-aware probe data.

FIG. 7 illustrates an example of vectored circle detection in three dimensions. Plot 71 illustrates a set of probe data vectors having a geographic location and a heading. The probe data vectors may have a length corresponding to a speed of the vehicle. The vectors may be normalized to unit length. Plot 72 illustrates that the probe data vector are translated at a first radius $R_1$. At the first radius $R_1$ the translated probe data are spaced apart. By way of example, these eight translated probe points may be aggregated into different cells of the multiple cells. Plot 73 illustrates that the probe data vector are translated at a second radius $R_2$. At the second radius $R_2$ the translated probe data are spaced tightly together. By way of example, these eight translated probe points may be aggregated into one single cell of the one or more cells of the location grid. Plot 74 illustrates that the probe data vector are translated at a third radius $R_3$. At the third radius $R_3$ the translated probe data are again spaced farther apart. By way of example, these eight translated probe points may be aggregated into different cells of the multiple cells of the location grid. The server 125 may compare how aggregated the translated probe data are to determine that $R_2$ should be selected as the radius of the new roundabout road formation.

Alternatively, as discussed above, the server 125 may segment the translated data point vectors into segments defined by heading. By way of example, having 8 segments of 45° heading range each, probe points on a half circle occupy 4 of the 8 segments in the same cell. In that example, a perfect full circle would occupy all eight segments. A cell, having probe points in 75% of all segments may be regarded to be "round enough". After aggregating all probe points into the Hough-Space, the 2D subspace on latitude and longitude is iterated for the location with the most occupied heading-segments in one radius range.

Thus, the iterations of the radii may be divided into radius ranges. Range $R_1$-$R_5$ may have one proportion of segments filled, range $R_6$-$R_{10}$ may have another proportion of segments filled, and range $R_{11}$-$R_{15}$ may have a third proportion of segments filled. The server 125 may selected the radius range having the highest percentage of segments filled. For example, the ranges 1 . . . 5, 6 . . . 10, 11 . . . 15 and 21 . . . 25, 26 . . . 30 [in meters] each have a segment count of 3 of 8 segments and the ranges 16 . . . 20 have 7 of 8 segments, then on that location the range 16 . . . 20 would be a location where a roundabout is estimated. The iteration through the ranges and through the location may be enhanced with a smoothing function.

The example in FIG. 7 at the center location (latitude, longitude) there are no headings at radius $R_1$ or $R_3$ but all-8 headings used at radius $R_2$. Accumulating the different radii into one chart, these would build the $3^{rd}$ dimension. The different headings or segments resulting from the headings would build the $4^{th}$ dimension.

The server 125 may select the size of discrete cells in the Hough-Space based on one or more static or dynamic factors. By way of example, the server 125 may determine the size based on user input, based on coordinates, based on probe data count or a combination of these. In another example, the server 125 may be determined by a different function. On the one hand, a coarse grid (e.g., large cells) is required to detect not exactly round roundabouts and not perfectly measured positions having the center of a tangential-probe not always at the same position. Thus, the server 125 may select larger cells when it is desired to be more inconclusive of the variance among roundabout shape. On the other hand, a too coarse aggregation grid cannot define the precise position of a location of interest within the cell. Thus, the server 125 may select a smaller cell size when location accuracy is preferred.

In some instances, this conflict is avoided by aggregating into a fine grid of four dimensional cells (latitude, longitude, radius, and heading) and later identify the location of interest using a floating pattern. A floating pattern or sliding window gathers information about the covered segments from the neighboring one or more cells of the location grid in addition to the cell itself. An example edge length of 1 meter may be used.

The server 125 may also check the each one or more resultant roundabout radius and locations against overlapping potential other one or more roundabout locations. For example, the server 125 may select two different roundabout centers that meet the threshold number of segment coverage or the threshold could within segments. Consider two circles with a 20 meter radius and only 2 meters between their centers. These two circles likely describe the same roundabout but the probe data focuses on two different centers. The server 125 may determine when more than one circles meet the threshold and the distance between the circles is, by way of example, less than the radius of at least one of the circles. The server 125 may identify this scenario as a double roundabout or an irregular roundabout. In another scenario, the server 125 may identify this scenario as an elliptical roundabout. The elliptical roundabout may correspond to a predetermined range of distances between circle centers (e.g., 2-20 meters) or a particular ratio of radius to distances between centers (e.g., 0.1-0.5). In another example, the server 125 may identify this as one roundabout having a multitude of insufficient localized probe points and merging the two potential roundabouts to one potential roundabout. When the data falls outside of the predetermined ranges or thresholds, the server 125 may determine that partly overlapping circles are derived from false locations and/or false heading information. For example, in urban areas there may be considerable noise (e.g., pedestrians, reflection, multipath caused by buildings or obstacles). Through these techniques, the server 125 may determine that the better fitting circle is more likely a roundabout in contrast to the worse fitting circle.

Figure 8:
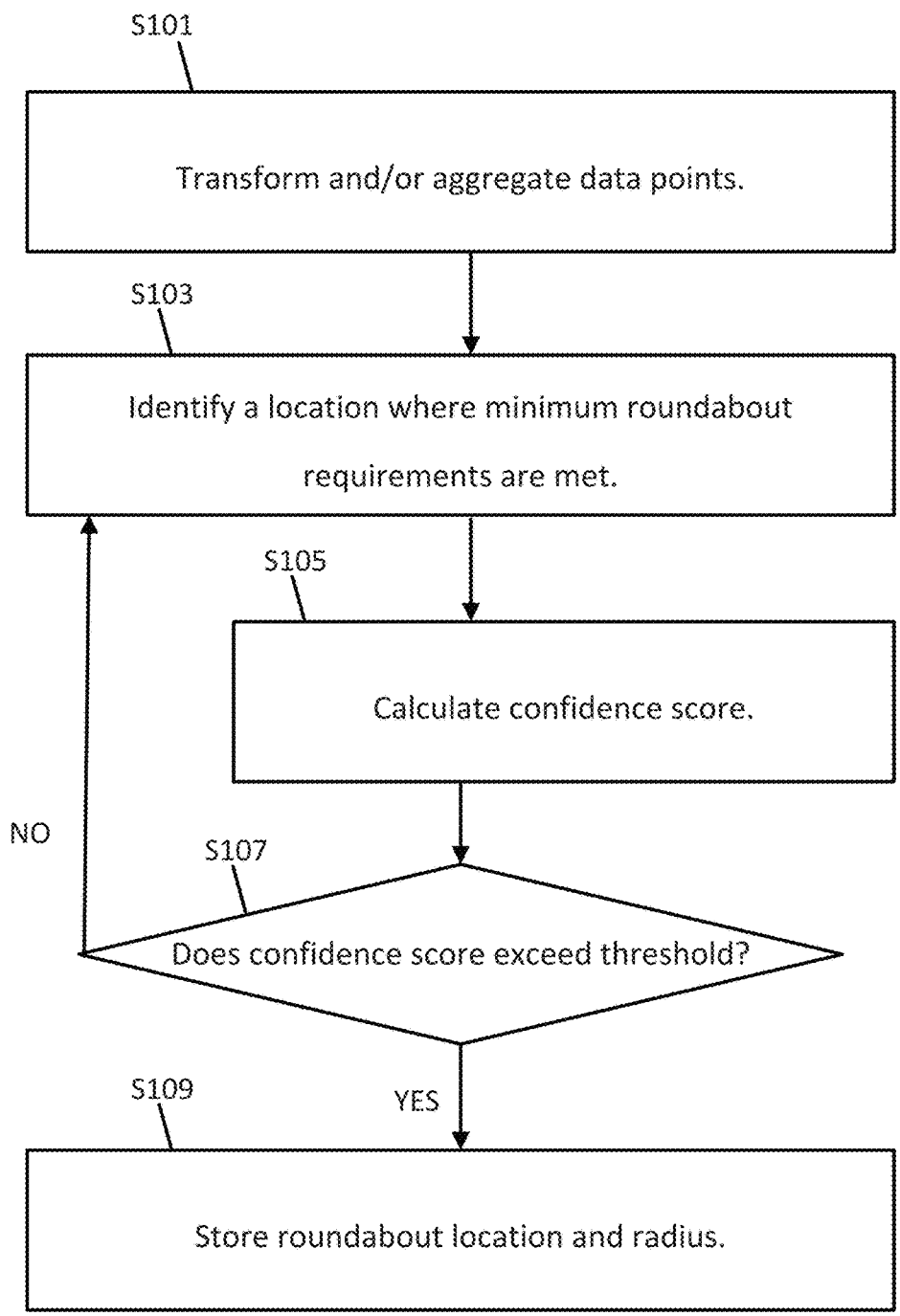
FIG. 8 illustrates an example flowchart for identifying roundabout locations.

FIG. 8 illustrates an example flowchart for identifying roundabout locations. The acts of the flowchart may be performed by the server 125 or a combination of devices. Additional, different, or fewer acts may be used.

In act S101, the server transforms or aggregates data points collected as probe data. The data may be transformed by a linear translation according to the right-hand or left-hand traffic rules described above. The data may be organized into cells of a grid. The cell sizes may be optimized to find the best aggregation of the data. The data may be segmented with the cells into heading based segments. Accounting or statistic based techniques may be used to evaluate the segmented data.

In act S103, through any of the techniques of act S101, the server identifies a location and/or a radius where the minimum roundabout requirements are met. The minimum requirements may require that a certain proportion of a cell is covered with data points have a certain range of heading values. The minimum requirements may state that at least a predetermined number of data points must be included in a threshold number of the segments defined by heading ranges.

In act S105, after the potential roundabout location is identified, the server 125 calculates a confidence score. The confidence score may be based on one confidence test. The confidence may be a total, aggregate, or average score for two or more confidence tests. The confidence tests may include any combination of a densities of distances test, a heading test, a tangential peak test, a low inner circle test, an inbound test, an outbound test, a speed heading test, or another test.

Each of the single rules or confidence tests may be assigned a weight or coefficient, defining a probability of reflecting the travel behavior in a roundabout and a second weight or coefficient, defining the unlikeliness of being a roundabout for calculating a total score. For example, some roundabouts may fail any one test but still have a total a sufficient total score to be classified as a roundabout. In one example, even a perfect roundabout may fail the "probe points within the circle" rule in the density by heading test if there is a separated road on a bridge cutting through the roundabout geometry on the latitude and longitude level and having slower speeds (e.g. in urban areas).

In act S107, the server compares the score to a threshold. When the score does not exceed the threshold, the flow returns to act S103 to identify another or the next best potential roundabout location. When the score exceeds the threshold, the server 125 stores the roundabout location and radius in the database 123.

Figure 9:
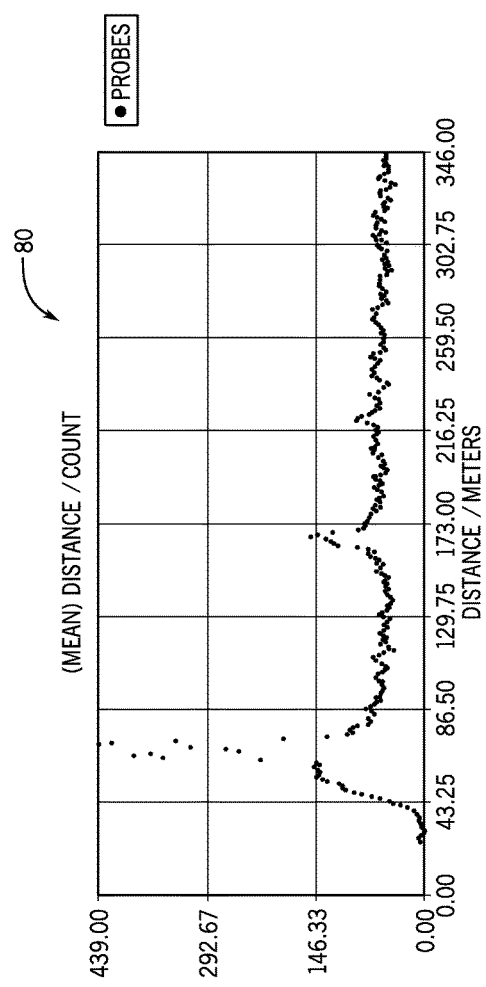
FIG. 9 illustrates a chart of the densities by distance of the probe data.

FIG. 9 illustrates a chart 80 of the densities of distance ranges of the probe data, which may be an average over aggregate data points for each distance range, of all of the data to the selected roundabout location from act S103. The server 125 analyzes the density of the data in order to calculate a density score. The server 125 counts the number of probe points within one or more distance ranges.

From possible locations, the density plot is created, counting all probes within a distance of the center. The probe count within the roundabout is relatively low (except when a highway or a high functional class road passes over or near a roundabout as bypasses).

In one example, the server 125 calculates a distance from the center of the roundabout for each of the probe points and sorts the probe points, or distances themselves. In one test, the server 125 determines a count of probe points within the circle (within the radius of the detected roundabout). The inner probe count should be low. When the probe count within the circle exceeds a threshold, the server 125 may disqualify the selected roundabout, and when the probe count does not exceed the threshold, the server 125 may confirm the selected roundabout.

In addition, the server 125 may identify a mode of the distance data, or a peak distance range. The span of the distance range may be a predetermined value such as 5 meters, 10 meters, or another value. The server 125 compares the peak distance range to the predetermined distance that represents a potential roundabout.

Because vehicles are slower within the roundabout and pass a longer distance at the same radius, the mobile devices provide a higher count of probe points on the circle than outside at the inbound and outbound radials. Therefore, the density-by distance plot of FIG. 9A has a peak at the distance of the radius and that the density tends to be in the plot-section with smaller distance to the center of the circle and is lower but greater than zero in the plot section with higher distance to the center of the circle.

This pattern may be identified by the server 125 by examining the highest peak in the density and measuring a dropoff off the peak on both sides. Due to the expected higher dropoff toward the center of the circle, a higher dropoff is checked to that side. Both dropoff indices may be estimated the inner and outer boundary of the roundabout. These are checked against the radius determined at act S103. If the radii from both methods are not similar, then some of the probe points have been aligned in a circle, but the probe density does not verify that all probes are generated from traffic through a roundabout. Optionally the density array is normalized by count per area of the radius range, so that circles with higher radius have lower density and the peak falls faster towards a low value.

Figure 10:
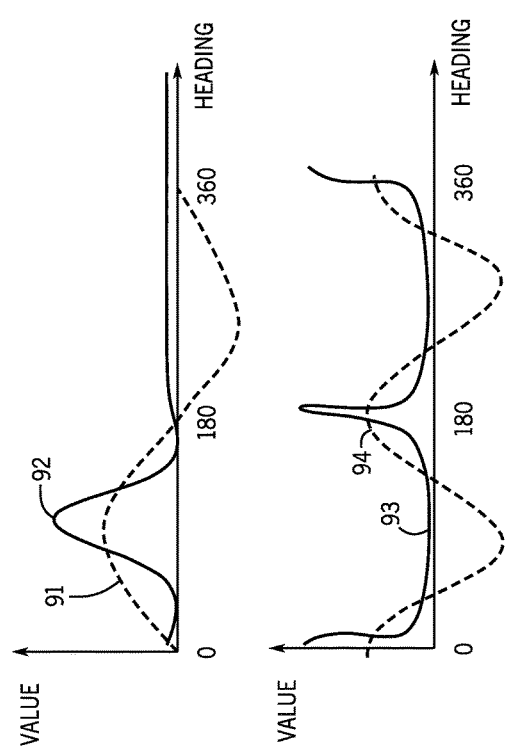
FIG. 10 illustrates an example peak identification technique.

FIG. 10 illustrates an example peak identification technique. Peaks may be identified with various approaches (e.g. sliding window or Fourier analysis). The different techniques may be applied to the densities by heading tests and may also be applied to any of the other tests below. Curve 91 is a sin(x) function, where x is the heading with a period length of 360°. Curve 92 illustrates an exemplary density by heading curve of the raw probe data. The density curve 92 has a peak at 90 degrees and a period length of 360 degrees. A Fourier analysis may identify the sin(x) curve as the most significant with a phase of 0, which means that the probe points density by heading have a peak at 90° suggesting that the majority of probe points is positioned in a 90° heading around the center as it would be visible in a roundabout. Curve 94 is a sin(2*x) function, where x is the heading with a period of 180°. Curve 93 illustrates an exemplary density by heading curve of the raw probe data. The density curve 93 has two peaks at 0 degrees and 180 degrees and a period length of 180 degrees. A Fourier analysis may identify the sin(2*x) curve as the most significant with a phase of 90 degrees, which means that the probe points density by heading have two peaks at 0° and 180° suggesting that the majority of probe points is positioned inbound towards and outbound away from the center as it would be visible at the radial roads outside of a roundabout circle.

Figure 11A:
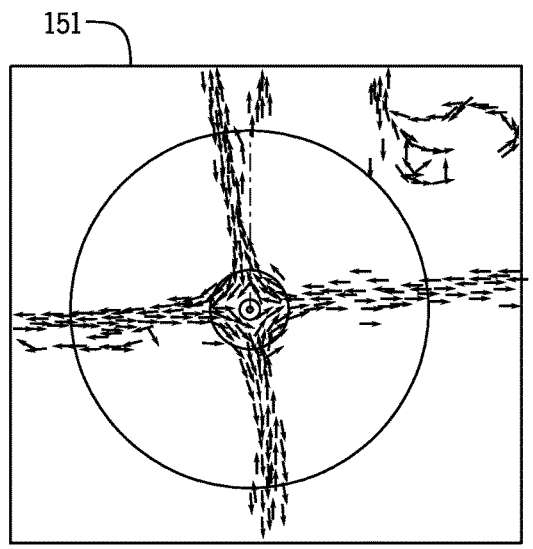
FIG. 11A illustrates an example plot of a roundabout.
Figure 11B:
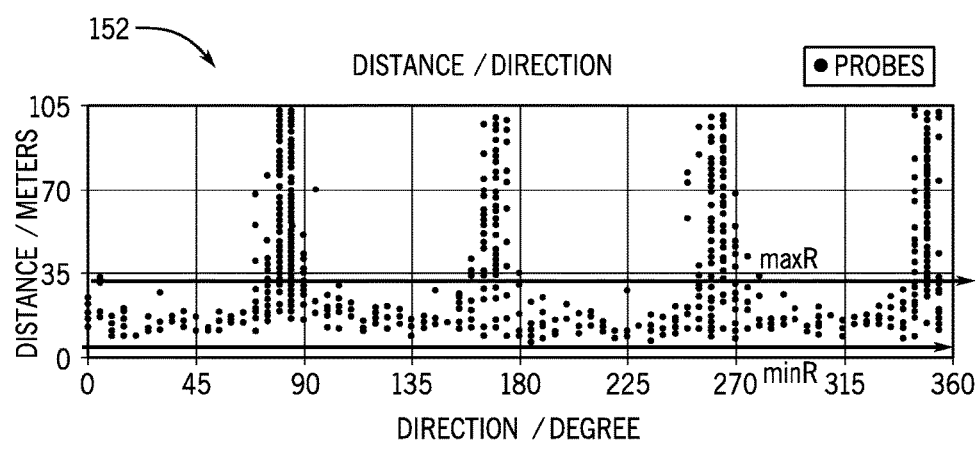
FIG. 11B illustrates an example chart of density by direction.

FIG. 11A illustrates an example plot 151 map of a roundabout with identified and marked circle (maxR) of the roundabout and the four identified radials). FIG. 11B illustrates an example chart 152 of distance by direction. The chart 152 illustrates a point for each probe point at a distance on the vertical axis and a direction on the horizontal access. The identified roundabout in plot 151 is bounded by a minimum radius (minR) and a maximum radius (maxR). The values for minR and maxR may be predetermined or set according to the number of lanes in the roundabout or identified by the probe density analysis. The server may perform a distance by direction test by filtering all probe data that is more than k*maxR from the selected center of the roundabout. The constant k may be any integer or fractional value such as 1. When the points inside the roundabout are filtered, and the probe data corresponds to a roundabout, the remaining data will be collected on the roads leading up to and away from the roundabout, as shown in FIG. 11A. By way of example, these directions may be identified using a Fourier analysis illustrated in FIG. 10, or any other suitable algorithm. By way of the example in FIG. 11A, these probe data should have direction values near 80, 170, 260, and 350, assuming the roundabout shape shown in FIG. 11A. The server 125 may calculate a distance by direction score depending on the concentration of data at these headings. When the distance by direction score the circle exceeds a threshold, the server 125 may disqualify the selected roundabout, and when the density by heading score does not exceed the threshold, the server 125 may confirm the selected roundabout.

In addition, the server may perform a density by heading test in the frame of reference of the selected roundabout location. For the purpose of this density by heading test, the server 125 may redefine heading values to the frame of reference of the roundabout center determined in act S103. The heading of a probe data point for this test may be defined as the degree-offset of the heading to the center point of the selected roundabout circle. Probe points traveling in the direction of the center are assigned a heading of 0, probe points traveling tangential counterclockwise with reference to the circle center are assigned a heading of 90, probe points traveling from the center are assigned a heading of 180, and probe points traveling tangential clockwise with reference to the circle center are assigned a heading of 270 degrees.

The server 125 may perform either of these density by heading tests by determining an heading outlier quantity for a number of the probe points at a heading range and a distance range from the roundabout center. The server 125 may compare the heading outlier quantity to a heading outlier threshold. When the heading outlier quantity exceeds the threshold (i.e., there are too many outlier points), the server 125 may dismiss that iteration of the potential radius of the roundabout. For example, the server 125 may select a new potential radius for the roundabout road formation when the heading outlier quantity exceeds the heading outlier threshold. When the heading outlier quality is less that the threshold, the server 125 may increase the confidence score of the associate potential radius or store the current radius as the radius for the roundabout road formation.

In addition or in the alternative, the headings are organized by density according to three different distance ranges. The distances ranges are less than the minimum radius selected for the roundabout (e.g., r<min R), within the minimum radius and maximum radius selected for the roundabout (e.g., minR<r<maxR), and greater than maximum radius to twice the maximum radius (e.g., maxR<r<2*maxR). There are very few probe points within the circle (e.g., r<min R). Directly at the circle (e.g., minR<r<maxR) nearly the majority of probe points have a heading of 90 degrees. Directly outside of the circle (e.g., maxR<r<2*maxR), the majority of probe points do travel either into the circle or out of the circle. Instead of 2*maxR, d*maxR may be used in which d is an integer or fractional value. By way of example, the ranges can overlap or can have a gap in between. By way of another example, more than three ranges can be used.

The server 125 may aggregate density by heading into a 3×8 matrix containing the 3 distance ranges in columns and 8 heading segments i=0 . . . 7 from each i*45°−22.5° to i*45°+22.5° in rows. The significant characteristic values are a tangential peak, a low inner circle value, and higher inbound/outbound peaks. The 3×8 matrix is shown in Table 1. Additional, different, partial, larger, or smaller arrangements may be used.

TABLE 1

|  | r < min R | minR < r < maxR | maxR < r < 2 * maxR |
|---|---|---|---|
| 337.5° to 22.5 | [0, 0] | [0, 1] | [0, 2] |
| 22.5° to 67.5° | [1, 0] | [1, 1] | [1, 2] |
| 67.5° to 112.5° | [2, 0] | [2, 1] | [2, 2] |
| 112.5° to 157.5° | [3, 0] | [3, 1] | [3, 2] |
| 157.5° to 202.5° | [4, 0] | [4, 1] | [4, 2] |
| 202.5° to 247.5° | [5, 0] | [5, 1] | [5, 2] |
| 247.5° to 292.5° | [6, 0] | [6, 1] | [6, 2] |
| 292.5° to 337.5° | [7, 0] | [7, 1] | [7, 2] |

The index values [row, column] may describe location in the matrix. The tangential peak occurs at location [2,1] in the matrix. The server 125 may calculate a tangential peak score depending on whether and the degree to which a number of points at location [2,1] is greater than that of locations [2,0], [2,2], [1,1], and [3,1].

The server 125 may calculate a low inner circle confidence score. For each n in 0 . . . 7 matrix[0,n]<matrix[1,n]. In other words, the server 125 may determine an interior quantity of a number of the probe points that are less than the quantity of a number of the probe points in the circle distance between the minimum Radius and the maximum Radius.

The server 125 may calculate an inbound score or outbound score based on inbound and outbound peaks, accordingly. By way of example, in the matrix column 3 representing probe point headings at a distance outside of maximum R, the number of inbound probe points with a heading towards the center matrix[0,2] are higher than the surrounding heading matrix[7,2], matrix [6,2], matrix[1,2], and matrix[2,2]. By way of example, in the matrix column 3 representing probe point headings at a distance outside of maximum R, the number of outbound probe points with a heading away from the center matrix[4,2] are higher than the surrounding heading matrix[2,2], matrix [3,2], matrix[5,2], and matrix[6,2].

When one or more of the low inner circle score, inbound score, outbound score, tangential peak scores within the circle exceeds a threshold, the server 125 may disqualify the selected roundabout, and when the one or more of the low inner circle score, inbound score, outbound score, tangential peak scores not exceed the threshold, the server 125 may confirm the selected roundabout.

The server 125 may also perform a speed by heading test. As a general rule, vehicles reduce speed when approaching a roundabout. The probe data within a predetermined distance may be organized according to speed. The server 125 may calculate a speed confidence score based on a percentage of the probe data associated with speeds greater than a threshold speed.

The server 125 may identify a speed for the probe points in each segment of the location grid described above. The probe points in each segment are compared to a speed threshold. The server 125 may exclude at least one of the plurality of points when the corresponding speed exceeds the speed threshold. The server may exclude a segment of the location grid or a cell of the location grid when a threshold number of the probe points exceed the speed threshold.

FIGS. 12-23B illustrates example intersections and examples of the plots above for the confidence tests.

Figure 12:
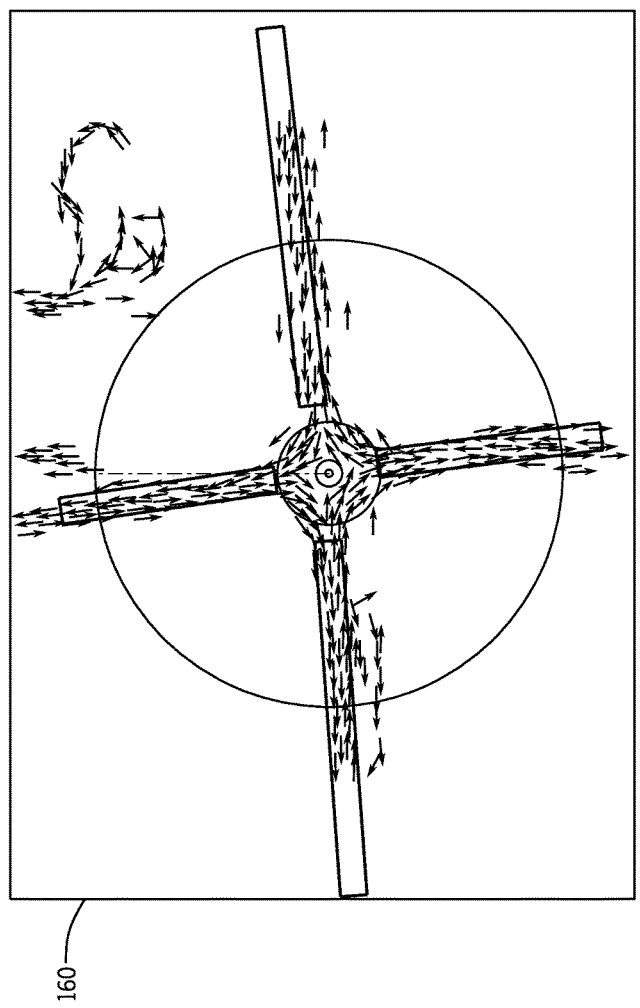
FIG. 12 illustrates an example regularly shaped roundabout.
Figure 13A:
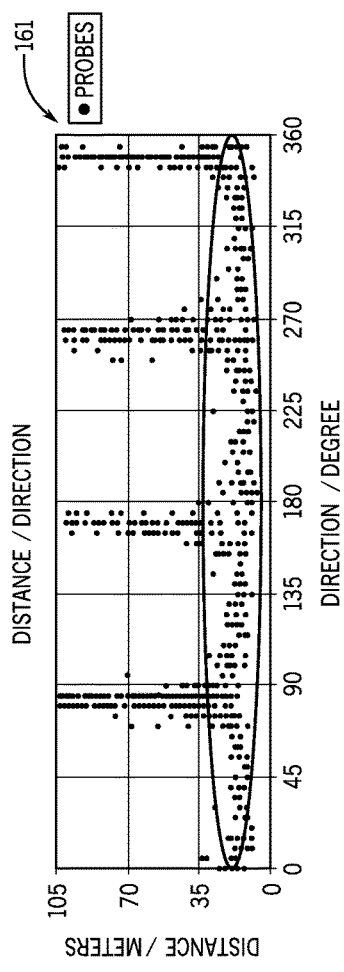
FIG. 13A illustrates a Distance-by-Direction diagram of roundabout in FIG. 12.

FIG. 12 illustrates a usual roundabout in plot 160. As shown in FIG. 13A, plot 161 illustrates the Distance-by-Direction plot of the roundabout in FIG. 12. Clearly the constant coverage of all directions at a distance (between minR and maxR) is identified. A server 125 may identify this by the described density-by-direction test.

Figure 13B:
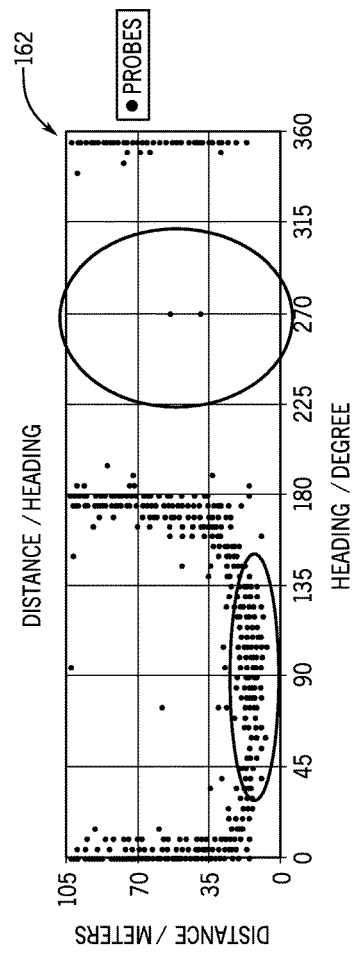
FIG. 13B illustrates a Distance-by-Heading diagram of roundabout in FIG. 12.

Further, in FIG. 13B, plot 162 illustrates Distance-by-Heading plot 162 of the roundabout in FIG. 12. Here the high density of probe points at a near distance with heading 90 is identifiable and the low density of probe points at heading 270. This plot is valid for right-handed traffic, whereas left-handed traffic would result in a flipped plot with low density at 90 and a high density at low distance at 270 degree.

Figure 14A:
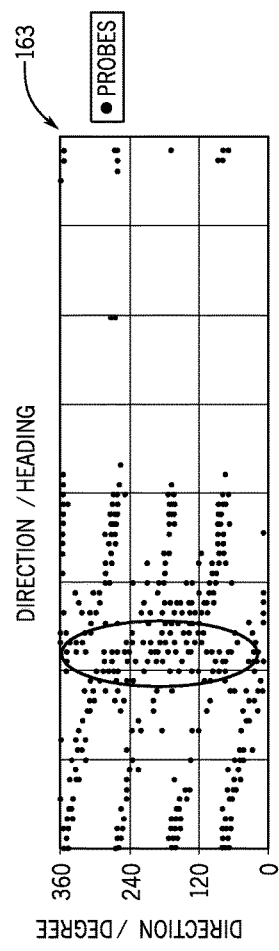
FIG. 14A illustrates a Direction-by-Heading diagram of roundabout in FIG. 12.

Further, in FIG. 14A, plot 163 illustrates the Direction-by-Heading plot 163 of the roundabout in FIG. 12. A server 125 may identify the continuous density of probe points at heading 90 degrees throughout all different directions, 0 . . . 359 degrees. At left-handed traffic the plot would be flipped resulting in a continuous density of probe points at heading 270 degrees throughout all different directions.

Figure 14B:
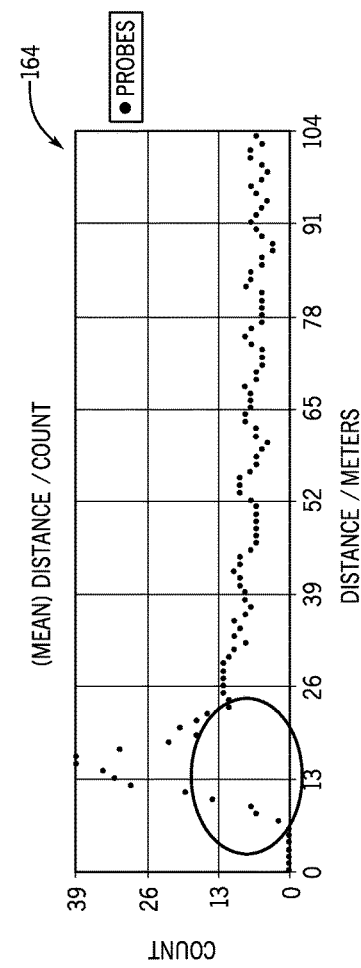
FIG. 14B illustrates a Density-by-Distance diagram of roundabout in FIG. 12.

Further, in FIG. 14B, plot 164 illustrates the Density-by-Distance plot 164, showing a high peak at a radius. In this example the radius is at around 13 meters. Additionally to that the density drops to nearly zero with smaller distances and it drops to less than 50% of the peak value at higher distances.

Figure 15:
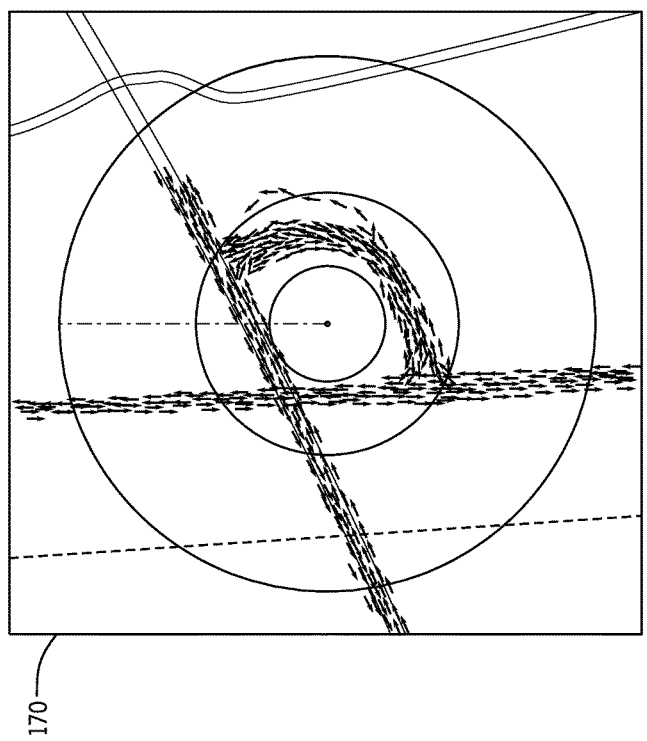
FIG. 15 illustrates an example loop or ramp between roadways.

FIG. 15 illustrates a loop intersection, which is not a roundabout, as shown in plot 170. This road layout is similar to a roundabout whereas a Density-by-Direction plot identifies a minR and a maxR of the structure.

Figure 16A:
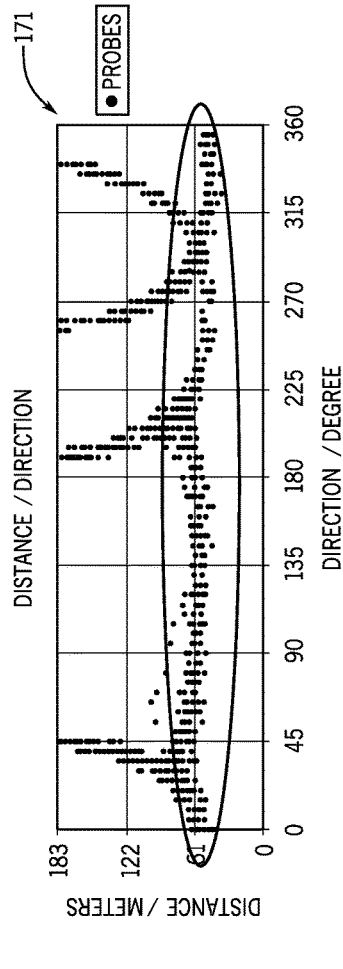
FIG. 16A illustrates a Distance-By-Direction diagram of Interchange in FIG. 15.

As shown in FIG. 16A, plot 171 illustrates a Distance-by-Direction plot 171 of the road structure illustrated in FIG. 15. A server 125 may identify the constant density of probe points at a distance throughout all directions 0 . . . 359 degrees.

Figure 16B:
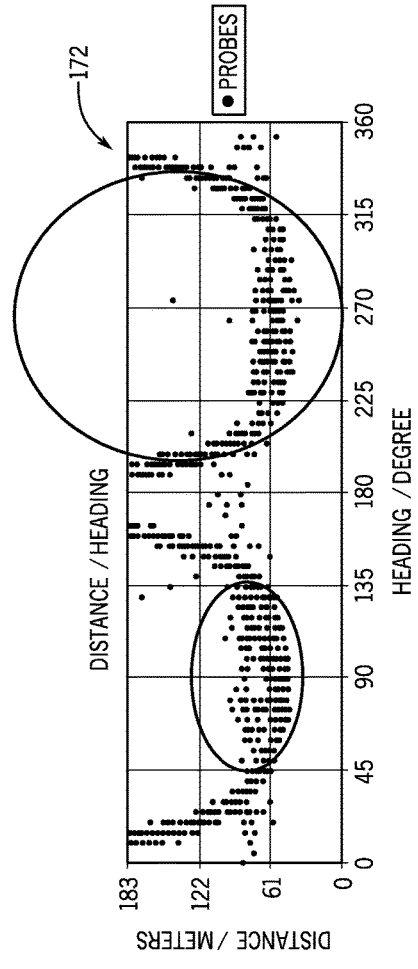
FIG. 16B illustrates a Distance-By-Heading diagram of Interchange in FIG. 15.

Further, in FIG. 16B, plot 172 illustrates a Distance-By-Heading plot from the road structure in FIG. 15. A server 125 may identify the high density of probe points within the minR-maxR-distance range, which may be a predetermined range. Due to the two way-interchange in this example, the server 125 may identify the high density of probe points at heading 270, which on a right-handed traffic roundabout do not occur and result in a failed test.

Figure 17A:
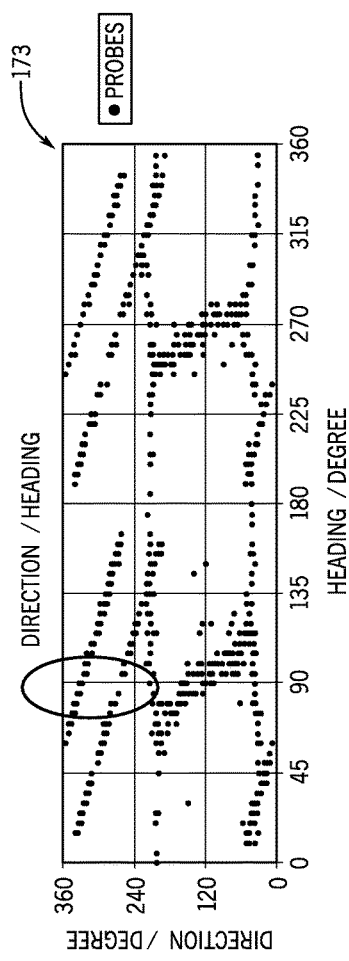
FIG. 17A illustrates a Direction-by-Heading diagram of Interchange in FIG. 15.

Further, in FIG. 17A, plot 173 illustrates a direction-by-Heading diagram of the road structure in FIG. 15. Here the missing continuity of probe point density at heading 90 throughout all directions 0 . . . 359 degrees is visible. A server 125 may result in a failed test by identifying this gap.

Figure 17B:
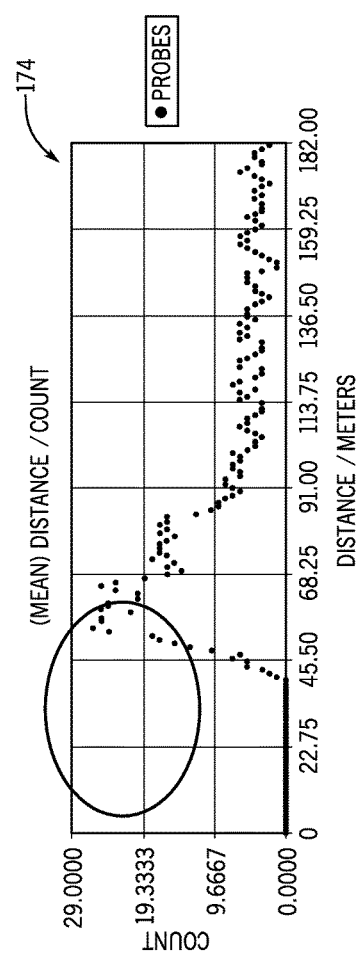
FIG. 17B illustrates a Density-by-Distance diagram of Interchange in FIG. 15.

Further, in FIG. 17B, plot 174 illustrates the density-by-Distance plot 174 showing a high peak at a radius. In this example the radius is at around 50 meters. Additionally to that the density drops to nearly zero with smaller distances and it drops to less than 50% of the peak value at higher distances. Thus, the server 125 can distinguish loop intersections, or cloverleaves, from roundabout road formations.

Figure 19A:
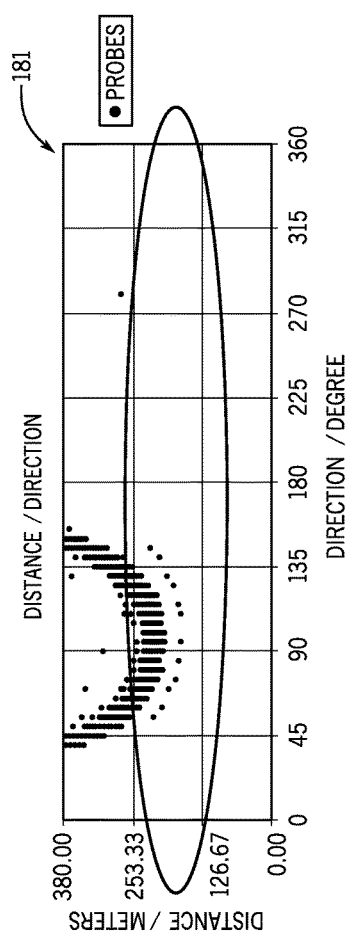
FIG. 19A illustrates a Distance-by-Direction diagram of the road in FIG. 18.
Figure 19B:
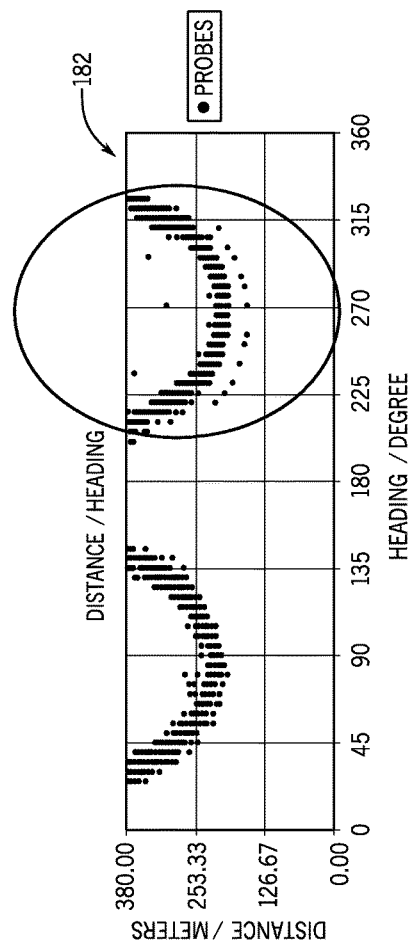
FIG. 19B illustrates a Distance-by-Heading diagram of the road in FIG. 18.

FIG. 18 illustrates a straight road, which is not a roundabout, as shown in plot 180. As shown in FIG. 19A, plot 181 illustrates a Distance-by-Direction plot 181 of the road structure illustrated in FIG. 18. A server 125 may identify the not continuous density of probe points at a distance, and thus failing the test Further, in FIG. 19B, plot 182 illustrates a Distance-By-Heading plot from the road structure in FIG. 18. A server 125 may identify the similar density of probe points at heading 270 degrees (on a right-handed traffic) or at heading 90 degrees (on a left-handed traffic) where in contrast a low density should exists. That identification may fail the test.

Figure 20A:
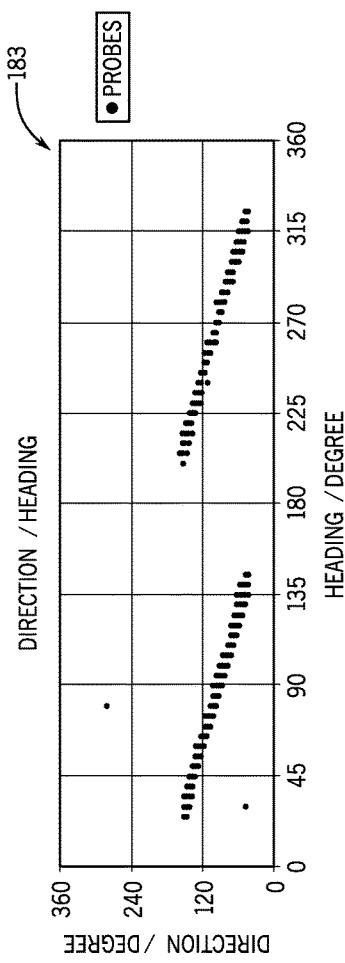
FIG. 20A illustrates a Direction-by-Heading diagram of the road in FIG. 18.

Further, in FIG. 20A, plot 183 illustrates a Direction-by-Heading diagram of the road structure in FIG. 18. Here the missing continuity of probe point density at heading 90 throughout all directions 0 . . . 359 degrees is visible. A server 125 may result in a failed test by identifying this gap.

Figure 20B:
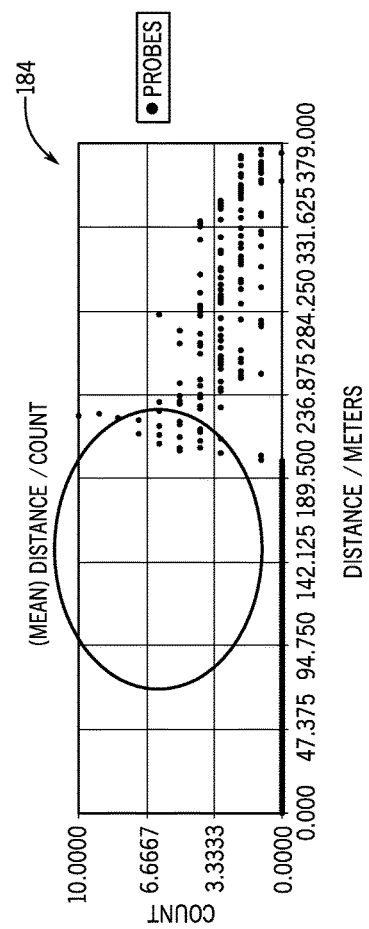
FIG. 20B illustrates a Density-by-Distance diagram of the road in FIG. 18.

Further, in FIG. 20B, plot 184 illustrates the Density-by-Distance plot 174 if the road structure in FIG. 18 showing a high peak at a radius. In this example the radius is at around 50 meters. Additionally to that the density drops to nearly zero with smaller distances and it drops to less than 50% of the peak value at higher distances.

Figure 21:
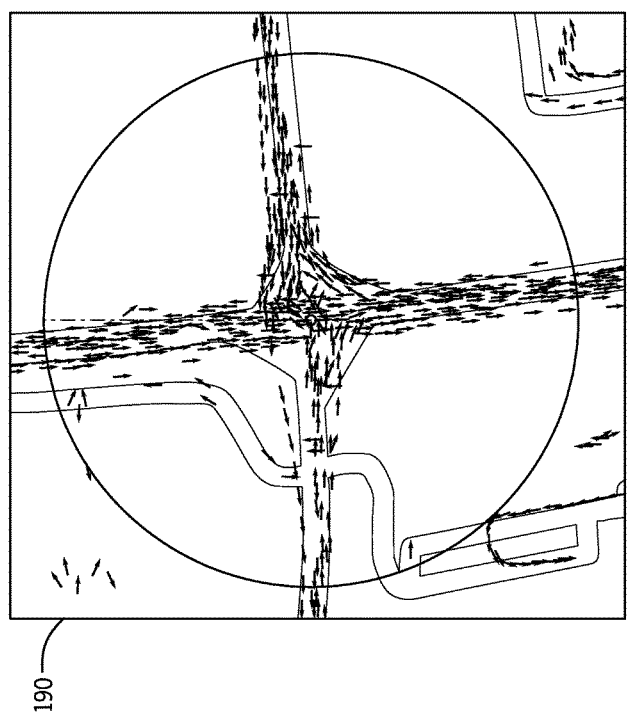
FIG. 21 illustrates an example non-roundabout intersection.

FIG. 21 illustrates a common road intersection, which is not a roundabout, as shown in plot 190.

Figure 22A:
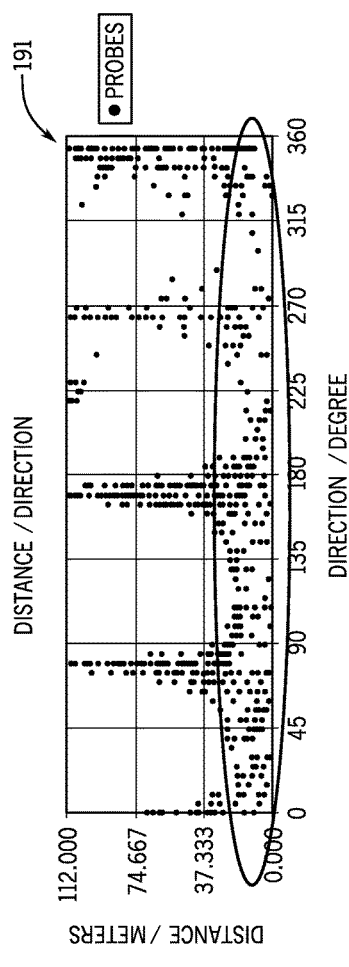
FIG. 22A illustrates a Distance-by-Direction diagram of the intersection in FIG. 21.

As shown in FIG. 22A, plot 191 illustrates the Distance-by-Direction plot of the road structure in FIG. 21. Clearly the continuous coverage of all directions at a distance (between minR and maxR) is identified. A server 125 may identify this by the described density-by-direction test. Alternatively, a server 125 may identify that the minimum Distance is near to zero and not really constant thus fail the test.

Figure 22B:
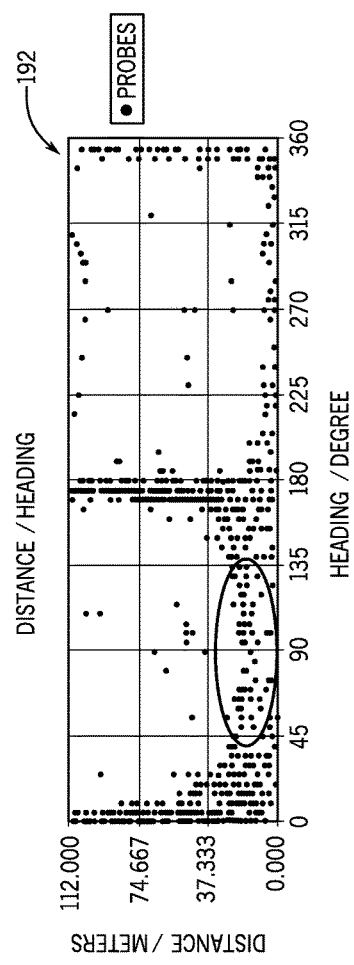
FIG. 22B illustrates a Distance-by-heading diagram of the intersection in FIG. 21.

Further, in FIG. 22B, plot 192 illustrates Distance-by-Heading diagram of the road structure in FIG. 21. Here the high density of probe points at a near distance with heading 90 with right handed traffic is not identifiable. Instead a relative to this density a higher density of probe points at heading 0 and heading 180 is identifiable. A server 125 may identify this inversion of densities and fail the distance by heading test.

Figure 23A:
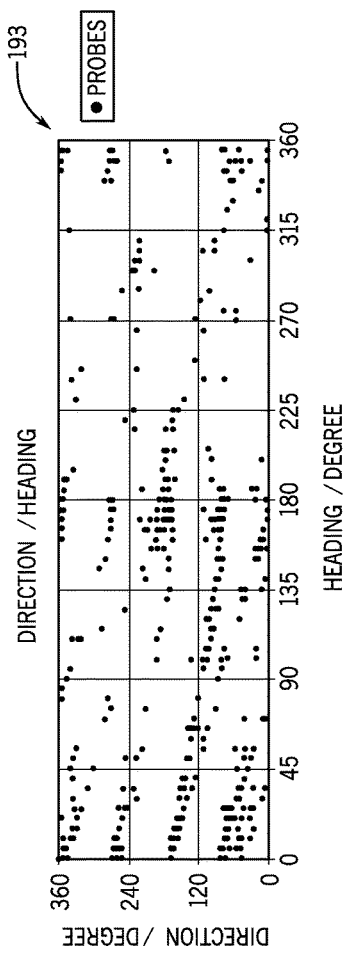
FIG. 23A illustrates a Direction-By-Heading diagram of the intersection in FIG. 21.

Further, in FIG. 23A, plot 193 illustrates a Direction-by-Heading diagram of the road structure in FIG. 21. Here the missing continuity of probe point density at heading 90 throughout all directions 0 . . . 359 degrees is visible. A server 125 may result in a failed test by identifying this gap. At left-handed traffic the density may be analyzed at heading 270 degrees.

Figure 23B:
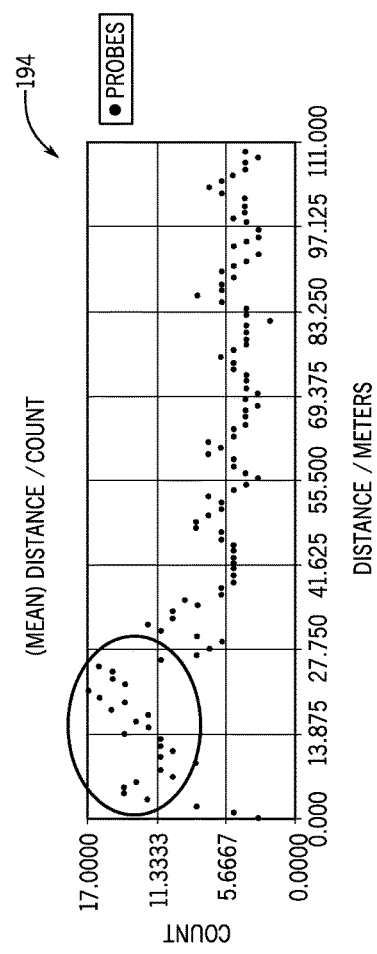
FIG. 23B illustrates a Density-by-Distance diagram of the intersection in FIG. 21.

Further, in FIG. 23B, plot 194 i a Density-by-Distance diagram of the road structure in FIG. 21. In this diagram a peak at about 25 meters distance from the center may be identified. However, a server 125 may not identify a significant reduction of the density below that distance. The Density-by-Distance test may fail.

Figure 24:
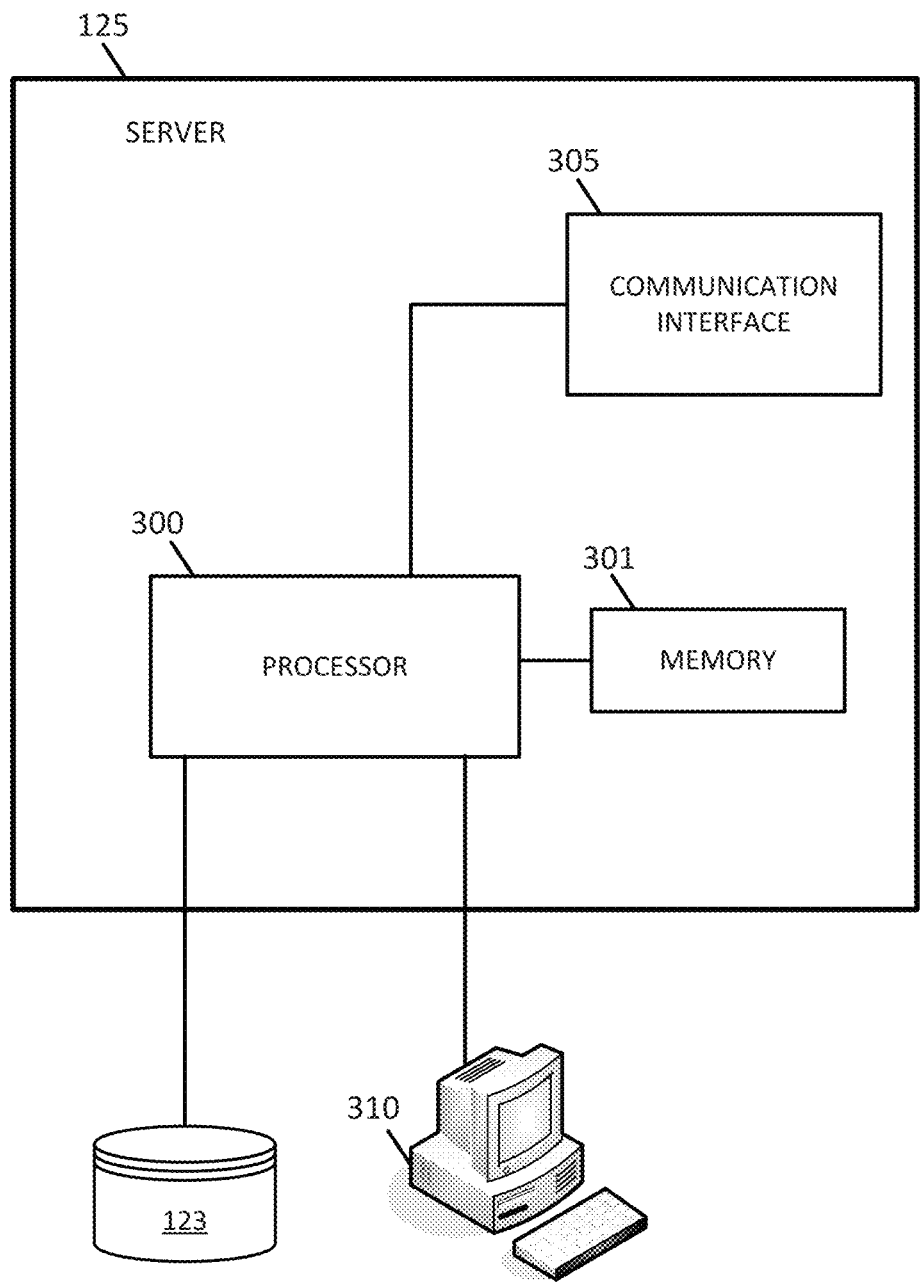
FIG. 24 illustrates an example server of the system for roundabout identification system.
Figure 25:
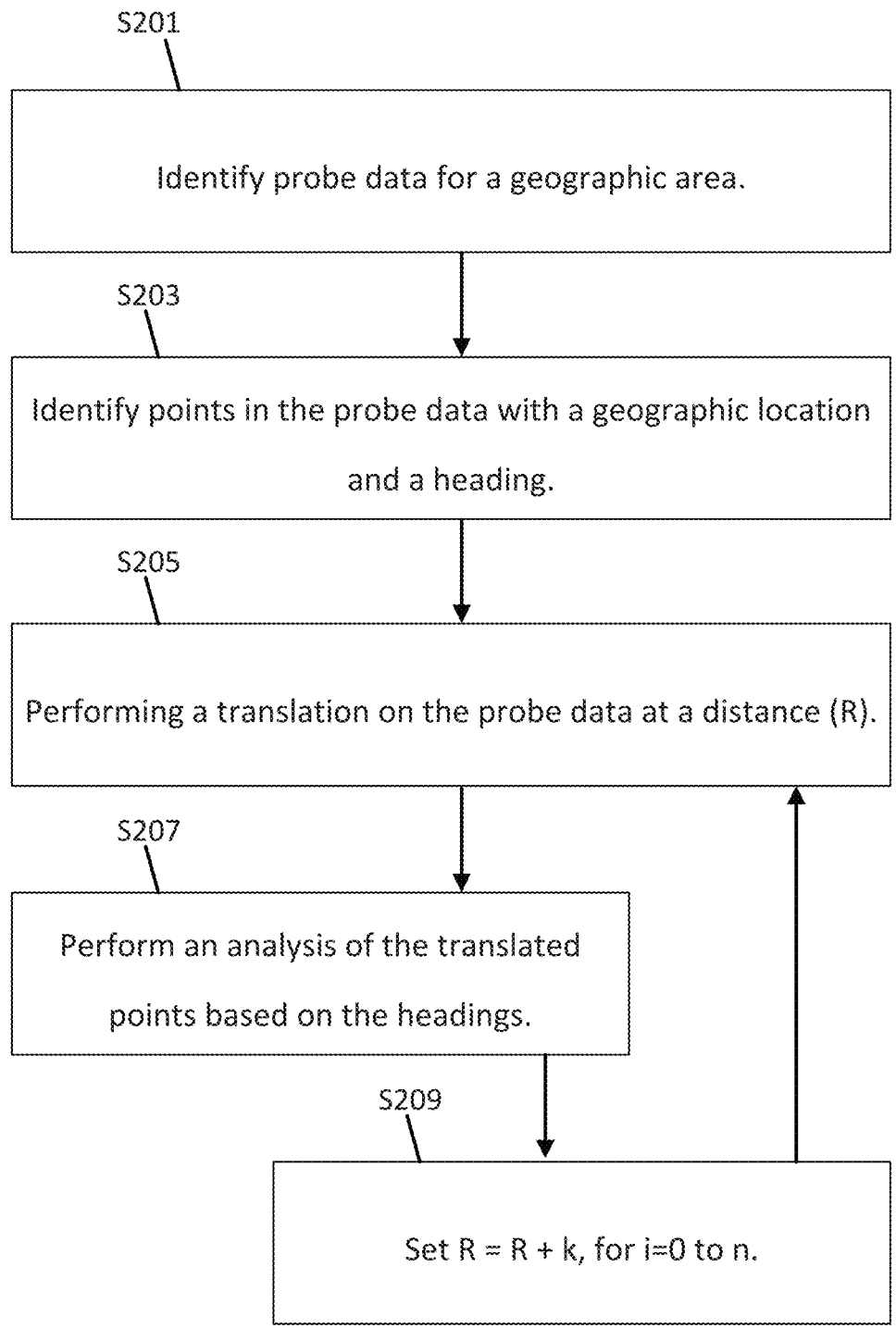
FIG. 25 illustrates an example flowchart for the server of FIG. 24

FIG. 24 illustrates an example server 125. The server 125 includes a processor 300, a communication interface 305, and a memory 301. The server 125 may be coupled to a database 123 and a workstation 310. The workstation 310 may be used to enter data regarding the compatibility of map tiles, the compatible ranges for map tiles, and the layers assigned to map tiles. The database 123 may include a versioned map data partitioned by layers and tiles as discussed above. Additional, different, or fewer components may be provided in the server 125. FIG. 25 illustrates an example flowchart for the operation of server 125. Additional, different, or fewer acts may be provided.

In act S201, the processor 300 or the communication interface 305 identifies probe data for a geographic area. The geographic area may be selected based on the potential location of a roundabout or another type of road formation. A user may select clusters of probe data that may correspond to roundabouts.

At act S203, the processor 300 identifies points in the probe data with a geographic location and a heading. Thus, each point includes at least two coordinates and an angle. The processor 300 may filter the data according to time, speed, or another variable. The processor 300 may aggregate groups of points within a small area. In one example, the processor 300 selects only the points in which a certain number exist within an area. For example, the processor 300 may select all clusters of 10 or more points within a 1 meter radius. The other points may be removed and the selected clusters may be reduced to a single point each.

In one example, the probe data may include altitude or height data. The altitude data may be used to filter out probe data from an elevation range. In this way, probe data collected on an overpass may be easily separated from the data collected at the roundabout. Thus, the processor 300 may filter the probe data according to altitude to exclude roadways at different elevations, such as overpasses and tunnels.

At act S205, the processor 300 performs a translation on the probe data by shifting the data at a direction (right, left, or both) that is perpendicular to the heading of the corresponding point. The data is translated by a distance R that corresponds to the potential radius of a roundabout.

At act S207, the processor 300 performs an analysis on the translated probe data. The analysis may be any of the examples above. The analysis may be a function of the heading of the data. The processor 300 may determine whether the distribution of the probe data across ranges of headings meets a threshold distribution. For example, the processor may determine whether a minimum number of data points falls within each heading range or within a minimum number of heading ranges.

At act S209, the distance R is adjusted. The distance R may be incremented or decremented by constant or variable values for a set number of times or until the analysis in S207 meets certain requirements. For each new value of R, S205 and S207 are repeated. When the results of the analysis are acceptable, such as by passing one or more of the confidence tests above, the processor 300 stores the roundabout location and/or radius in memory 301 or database 123.

The processor 300 may perform a historical comparison by scanning the probe data for location where no roundabout has been detected before as a possible report for changed infrastructure.

The processor 300 may perform a comparison with any road network model to identify if the intersection at a detected roundabout location is also existing as a roundabout in that road network model. By way of example, the intersection could be stored as common intersection within the road network model and an update of that location could be triggered. An update of that location can be done by manual editing, automated processes, or any other method.

The processor 300 may perform a roundabout interference can be added so that an identification of two roundabouts interfering with each other is ruled out. Occasionally some bad located points can lead into a detection of another roundabout that is interleaving with the first one. Since this would not be a correct identification, this rule can be used to eliminate false positives.

Figure 26:
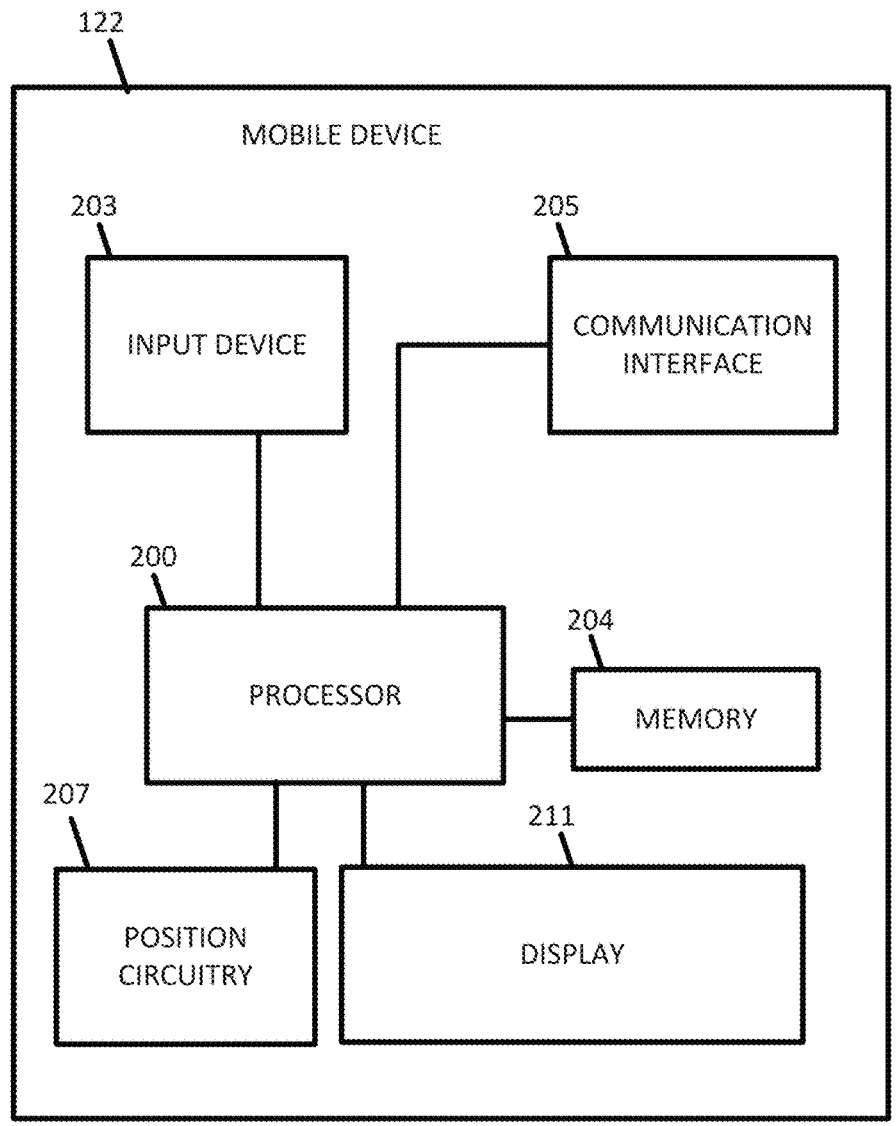
FIG. 26 illustrates an example mobile device in the system for roundabout identification system.
Figure 27:
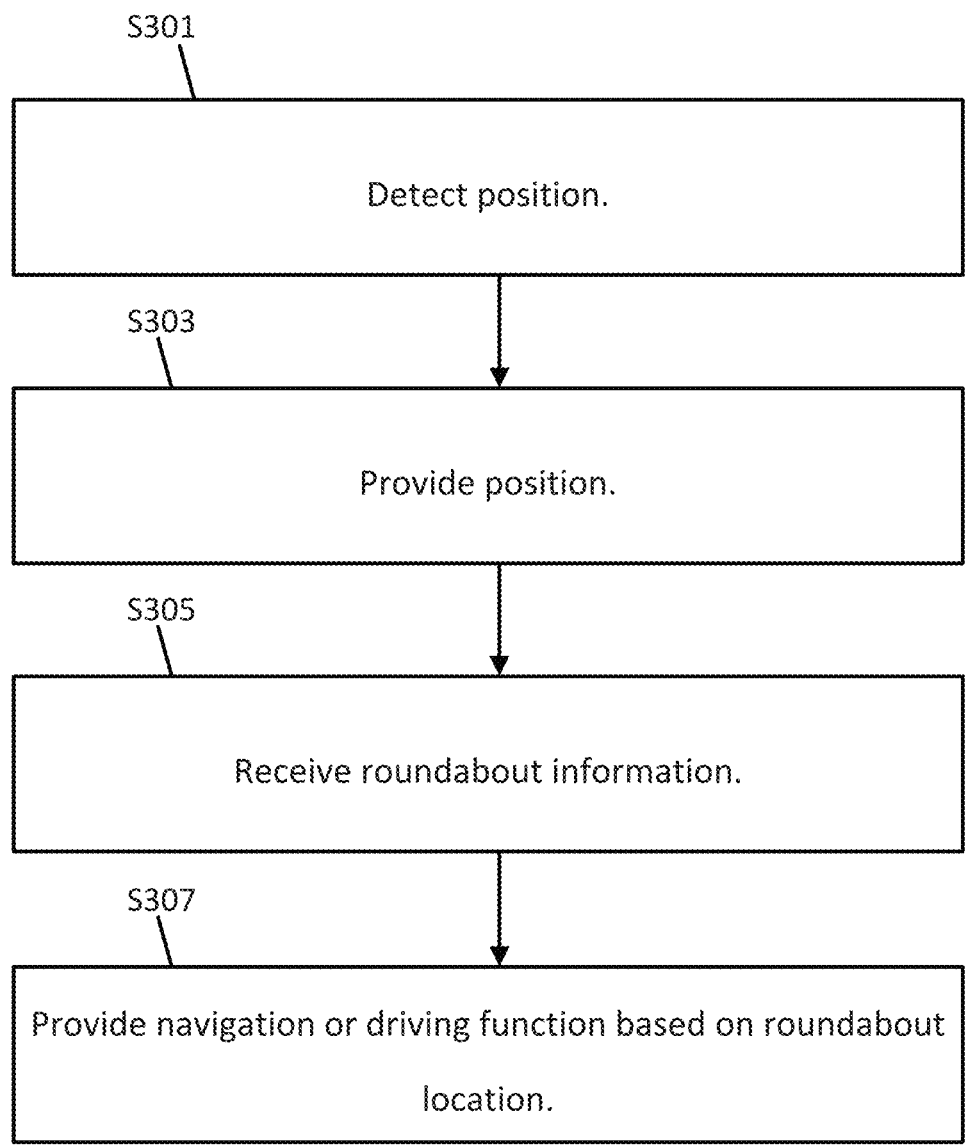
FIG. 27 illustrates an example flowchart for the mobile device of FIG. 26.

FIG. 26 illustrates an exemplary mobile device 122 of the system of FIG. 1. The mobile device 122 includes a processor 200, a memory 204, an input device 203, a communication interface 205, position circuitry 207, and a display 211. Additional, different, or fewer components are possible for the mobile device 122. FIG. 27 illustrates an example flowchart for the operation of the mobile device 122. Additional, different, or fewer acts may be used.

The mobile device 122 (or navigation device 122) is configured to execute routing algorithms to determine an optimum route to travel along a road network from an origin location to a destination location in a geographic region. Using input from the end user, the navigation device 122 examines potential routes between the origin location and the destination location to determine the optimum route. The navigation device 122 may then provide the end user with information about the optimum route in the form of guidance that identifies the maneuvers required to be taken by the end user to travel from the origin to the destination location. Some navigation devices 122 show detailed maps on displays outlining the route, the types of maneuvers to be taken at various locations along the route, locations of certain types of features, and so on.

At act S301, the processor 200 or the position circuitry 207 detects the position and the heading of the navigation device 122. The detected positions and headings may be the probe data described herein. In addition, the detected positions and/or headings may be used to provide one or more navigation or driving functions.

At act S303, the processor 200 or the communication interface 205 provides the position. The position may be provided to a geographic database lookup which may be local to the navigation device 122 at memory 201 or at database 123. Map data related to the position is returned.

At act S305, the processor 200 or the communication interface 205 receives at least one roundabout information in the map data. The roundabout information may include a geographic position of the roundabout and a size of the roundabout.

At act S307, the navigation device 122 provides a navigation or driving function based on the roundabout information. A map or geographic database is improved because maneuvers for the roundabouts may be provides. The routes derived from these databases may be more precise. For example, the route may include a routing instruct stating, "proceed left to the right lane of the roundabout" or "proceed halfway through the roundabout" or "take the third right in the roundabout."

Driving assistance may be provided based on the roundabout information and an array of sensors that may include any combination of a brake sensor, a steering sensor, an environment sensor, a vehicle sensor, an optical sensor, and an inertial sensor. Additional, different, or fewer sensors may be used.

The brake sensor may be a brake pedal sensor that detects displacement of the brake pedal of the vehicle. The brake sensor may detect the actuation of the brake pads near the wheel of the vehicle. The brake sensor may be a circuit that detects operation of the brakes through an anti-lock brake system. The steering sensor may be a steering wheel sensor that detects movement of the steering wheel of the vehicle. The steering sensor may detect the angle of the steering wheel. The steering sensor may detect the angle of the front wheel of the vehicle. The environment sensor may detect the environment of the vehicle. The environment sensor may include a weather sensor such as a thermometer, barometer, or a rain sensor. The rain sensor may detect the movement of windshield wipers. The vehicle sensor may detect an operation of the vehicle. The vehicle sensor may include a throttle sensor that measures a position of a throttle of the engine or a position of an accelerator pedal, a speedometer sensor, or a tachometer sensor. The vehicle sensor may detect a malfunction of the vehicle. For example, the vehicle sensor may be a tire pressure sensor. The optical sensor may include a camera, a LiDAR device, a proximity sensor, or another sensor configured to detect distances to nearby objects or when a nearby object exists. The optical sensor may send a signal that reflects off another object and is detected by the optical sensor. The inertial sensor may include an inertial measurement unit (IMU) including one or more of an accelerometer, a gyroscope, and a magnetic sensor. The inertial sensor may generate data indicative of the acceleration, deceleration, rotational acceleration, and rotation deceleration experienced by the vehicle.

The vehicles 124 may be assisted driving vehicles. Assisted driving vehicles include autonomous vehicles, highly assisted driving (HAD), and advanced driving assistance systems (ADAS). Any of these assisted driving systems may be incorporated into mobile device 122. Alternatively, an assisted driving device may be included in the vehicle 124. The assisted driving device may include memory, a processor, and systems to communicate with the mobile device 122.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the roundabout information.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the roundabout information.

Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue controls for these feature in response to roundabout information.

The road link data records of the database 123 may be associated with attributes of or about the roads such as, for example, geographic coordinates, street names, address ranges, speed limits, turn restrictions at intersections, and/or other navigation related attributes (e.g., one or more of the road segments is part of a highway or tollway, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The node data records may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

The databases 123 may be maintained by one or more map developers (e.g., the first company and/or the second company). A map developer collects geographic data to generate and enhance the database. There are different ways used by the map developer to collect data. These ways include obtaining data from other sources such as municipalities or respective geographic authorities. In addition, the map developer may employ field personnel (e.g., the employees at the first company and/or the second company) to travel by vehicle along roads throughout the geographic region to observe features and/or record information about the features. Also, remote sensing such as, for example, aerial or satellite photography may be used.

The database 123 may be master geographic databases stored in a format that facilitates updating, maintenance, and development. For example, a master geographic database or data in the master geographic database is in an Oracle spatial format or other spatial format, such as for development or production purposes. The Oracle spatial format or development/production database may be compiled into a delivery format such as a geographic data file (GDF) format. The data in the production and/or delivery formats may be compiled or further compiled to form geographic database products or databases that may be used in end user navigation devices or systems.

For example, geographic data is compiled (such as into a physical storage format (PSF) format) to organize and/or configure the data for performing navigation-related functions and/or services, such as route calculation, route guidance, map display, speed calculation, distance and travel time functions, and other functions, by a navigation device. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received geographic database in a delivery format to produce one or more compiled navigation databases.

The positioning circuitry 207 may include a Global Positioning System (GPS), Global Navigation Satellite System (GLONASS), Galileo, BeiDou or the Indian Regional Navigation Satellite System, or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer built or embedded into or within the interior of the mobile device 122. The accelerometer is operable to detect, recognize, or measure the rate of change of translational and/or rotational movement of the mobile device 122. The mobile device 122 receives location data from the positioning system. The location data indicates the location of the mobile device 122.

The input device 203 may be one or more buttons, keypad, keyboard, mouse, stylist pen, trackball, rocker switch, touch pad, voice recognition circuit, or other device or component for inputting data to the mobile device 100. The input device 203 and the display 211 may be combined as a touch screen, which may be capacitive or resistive. The display 211 may be a liquid crystal display (LCD) panel, light emitting diode (LED) screen, thin film transistor screen, or another type of display.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or is operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
receiving probe data for a geographic area;
identifying a plurality of points in the probe data, wherein each of the plurality of points includes a geographic location and a heading;
performing, by a processor, a translation of locations of the plurality of points in the probe data in a predetermined direction orthogonal to the corresponding heading;
aggregating the plurality of points, after translating, according to a location grid;
performing, by the processor, an analysis on the plurality of points in the location grid according to the heading; and
identifying a center of a roundabout road formation based on the analysis.

2. The method of claim 1, wherein the analysis comprises:
segmenting the plurality of points into a plurality of directional segments within a cell of the location grid, wherein the roundabout road formation is identified when a threshold number of the direction segments within the cell include one or more of the plurality of points.

3. The method of claim 1, wherein the translation is a first translation, and the analysis is a first analysis, the method further comprising:
performing a second translation on the plurality of points in the probe data in a second predetermined direction orthogonal to the corresponding heading;
aggregating the plurality of points, after translating, according to the location grid; and
performing a second analysis on the plurality of points in the location grid according to the heading,
wherein the center of the roundabout road formation is identified based on the first analysis and the second analysis.

4. The method of claim 1, further comprising:
selecting a subset of the geographic area for an estimate intersection location based on a user input or stored map data.

5. The method of claim 1, further comprising:
calculating a distance from the center of the roundabout road formation for each of the plurality of points;
sorting the plurality of points according to the distance from the center of the roundabout road formation;
identifying a peak distance range; and
comparing the peak distance range to a predetermined distance.

6. The method of claim 1, further comprising:
determining an interior quantity of a number of the plurality of points that are less than a predetermined distance from the roundabout center of the road formation; and
comparing the interior quantity to an interior threshold value.

7. The method of claim 1, further comprising:
identifying a speed for the plurality of points in the location grid;
comparing the speed to a speed threshold; and
excluding at least one of the plurality of points when the corresponding speed exceeds the speed threshold.

8. The method of claim 1, further comprising:
storing the center of the roundabout road formation and a distance for the roundabout road formation in a geographic database.

9. The method of claim 1, further comprising:
providing routing from an origin to a destination through the roundabout road formation.

10. The method of claim 1, wherein the plurality of points in the probe data, after translating and aggregating, form a four-dimensional space.

11. The method of claim 10, wherein the four-dimensional space includes the heading, a radius, and two dimensions for the geographic location of the plurality of points.

12. The method of claim 1, further comprising:
determining a heading outlier quantity for a number of the plurality of points at a heading range and a distance range from the roundabout center of the road formation; and
comparing the heading outlier quantity to a heading outlier threshold.

13. The method of claim 12, further comprising:
selecting a new potential radius for the roundabout road formation when the heading outlier quantity exceeds the heading outlier threshold.

14. The method of claim 1, wherein multiple potential radius values area identified for the roundabout road formation, and the analysis selects one of multiple potential radius values.

15. The method of claim 14, further comprising:
receiving a user input for the multiple potential radius values for the roundabout road formation.

16. The method of claim 14, further comprising:
determining the multiple potential radius values for the roundabout road formation based on a statistical analysis of the plurality of points.

17. An apparatus comprising:
at least one processor; and
at least one memory including computer program code for one or more programs; the at least one memory and the computer program code configured to, with the at least one processor, cause the apparatus to at least perform:
receiving probe data for a geographic area;
identifying a plurality of points in the probe data, wherein each of the plurality of points includes a geographic location and a heading;
performing a plurality of translations on the plurality of points in the probe data in a predetermined direction orthogonal to the corresponding heading, wherein the plurality of translations are based on iterations of potential radius distances for a roundabout;
performing an analysis on the plurality of points in a grid according to the heading; and
identifying a center of the roundabout based on the analysis.

18. The apparatus of claim 17, the at least one memory and the computer program code configured to, with the at least one processor, cause the apparatus to at least perform:
selecting one of the potential radius distances based on the analysis.

19. The apparatus of claim 18, the at least one memory and the computer program code configured to, with the at least one processor, cause the apparatus to at least perform:
storing the one of the potential radius distances and the center of the roundabout in a map database.

20. A non-transitory computer readable medium including instructions that when executed are operable to:
receiving probe data for a geographic area;
identifying a plurality of points in the probe data, wherein each of the plurality of points includes a geographic location and a heading;
performing a first translation on the plurality of points in the probe data in a predetermined direction orthogonal to the corresponding heading at a first radius distance;
performing a second translation on the plurality of points in the probe data in the predetermined direction orthogonal to the corresponding heading at a second radius distance;
performing an analysis on the plurality of points in a grid according to the heading; and
selecting the first radius distance or the second radius for a roundabout based on the analysis.

* * * * *